(12) United States Patent
Klausen et al.

(10) Patent No.: US 12,002,193 B2
(45) Date of Patent: Jun. 4, 2024

(54) INSPECTION DEVICE FOR INSPECTING A BUILDING OR STRUCTURE

(71) Applicant: ScoutDI AS, Trondheim (NO)

(72) Inventors: Kristian Klausen, Trondheim (NO); Øystein Skotheim, Trondheim (NO); Morten Fyhn Amundsen, Trondheim (NO)

(73) Assignee: SCOUTDI AS, Trondheim (NO)

( * ) Notice: Subject to any disclaimer, the term of this patent is extended or adjusted under 35 U.S.C. 154(b) by 0 days.

(21) Appl. No.: 17/896,771

(22) Filed: Aug. 26, 2022

(65) Prior Publication Data

US 2023/0073689 A1  Mar. 9, 2023

Related U.S. Application Data

(63) Continuation of application No. PCT/EP2021/067576, filed on Jun. 25, 2021.

(30) Foreign Application Priority Data

Jul. 10, 2020 (GB) .................................. 2010686

(51) Int. Cl.
  *G06T 7/00* (2017.01)
  *G06T 7/11* (2017.01)
(52) U.S. Cl.
  CPC .............. *G06T 7/0004* (2013.01); *G06T 7/11* (2017.01); *G06T 2207/30184* (2013.01)
(58) Field of Classification Search
  CPC ..................... G06T 7/0004; G06T 7/11; G06T 2207/30184
  See application file for complete search history.

(56) References Cited

U.S. PATENT DOCUMENTS 8,705,893 B1 * 4/2014 Zhang ..................... G06T 7/33
                                                                  382/285
9,423,250 B1 * 8/2016 Troy ........................ G01S 5/16
                                   (Continued)

FOREIGN PATENT DOCUMENTS

CN       108846900 A       11/2018
CN       111158541 A        5/2020
                     (Continued)

OTHER PUBLICATIONS

Stoyanov et al. ("On the Accuracy of the 3D Normal Distributions Transform as a Tool for Spatial Representation," 2011 IEEE International Conference on Robotics and Automation, May 9-13, 2011) (Year: 2011).*

(Continued)

*Primary Examiner* — Manav Seth
(74) *Attorney, Agent, or Firm* — Dority & Manning, P.A.

(57) ABSTRACT

A method for processing data captured by an inspection device during inspection of a building or structure, the method comprising:
  receiving sets of inspection data captured by one or more inspection sensors onboard the inspection device, each set of inspection data being captured from a different region of the building or structure and being suitable for evaluating the condition of the building or structure in the respective region, each set of inspection data being captured at a respective point in time as the inspection device maneuvers relative to the building or structure;
  receiving sets of 3D data of the inspection device's surroundings, each set of 3D data being captured by one or more depth sensors onboard the inspection device at a respective point in time, wherein each set of 3D data comprises information indicating a distance of (Continued)

the device from one or more surfaces of the building or structure at the time of capture of the set of 3D data;

combining the sets of 3D data to obtain a 3D map of the device's surroundings when carrying out the inspection; and outputting data indicating, for each set of inspection data, a position of the device in the 3D map at which the set of inspection data was captured.

24 Claims, 11 Drawing Sheets

(56) References Cited

U.S. PATENT DOCUMENTS

| 10,546,371 | B1* | 1/2020 | Pyznar | G01M 5/0066 |
|---|---|---|---|---|
| 11,170,489 | B2* | 11/2021 | Pyznar | G06T 7/0002 |
| 2006/0139454 | A1* | 6/2006 | Trapani | H04N 5/9206 |
| | | | | 348/148 |
| 2010/0215212 | A1* | 8/2010 | Flakes, Jr. | G05D 1/0094 |
| | | | | 348/E7.085 |
| 2012/0216106 | A1* | 8/2012 | Casey | G06F 40/174 |
| | | | | 715/224 |
| 2015/0094089 | A1* | 4/2015 | Moeglein | H04W 4/33 |
| | | | | 455/456.1 |
| 2015/0345976 | A1* | 12/2015 | Moore | G01C 21/3638 |
| | | | | 701/519 |
| 2016/0220816 | A1* | 8/2016 | Brown | A61N 1/326 |
| 2018/0144547 | A1* | 5/2018 | Shakib | G06T 15/503 |
| 2019/0373184 | A1* | 12/2019 | Kawaguchi | H04N 5/272 |
| 2019/0385373 | A1* | 12/2019 | Mittleman | G08B 29/18 |
| 2020/0026310 | A1* | 1/2020 | Nishita | G01C 15/002 |
| 2020/0151867 | A1 | 5/2020 | Pyznar | |
| 2020/0279367 | A1* | 9/2020 | White | G05D 1/0094 |
| 2020/0293773 | A1* | 9/2020 | Loveland | B64C 39/024 |
| 2021/0173414 | A1* | 6/2021 | Starr | G08G 5/045 |
| 2022/0214448 | A1* | 7/2022 | Li | G01S 7/40 |

FOREIGN PATENT DOCUMENTS

| GB | 2551609 A | * | 12/2017 | | G01C 3/08 |
|---|---|---|---|---|---|
| KR | 101772977 B1 | * | 8/2017 | | B25J 9/163 |
| WO | WO-2017214400 A1 | * | 12/2017 | | |
| WO | WO-2018083698 A1 | * | 5/2018 | | G01C 11/02 |

OTHER PUBLICATIONS

Wang et al. ("A Brief Review on Loop Closure Detection with 3D Point Cloud," IEEE International Conference on Real-time Computing and Robotics; Date of Conference: Aug. 4-9, 2019) (Year: 2019).*

Biber et al. ("The normal distributions transform: A new approach to laser scan matching," Proceedings 2003 IEEE/RSJ International Conference on Intelligent Robots and Systems, 2003) (Year: 2003).*

Cheng et al. ("Registration of Laser Scanning Point Clouds: A Review," Sensors (Basel). May 2018; 18(5): 1641) (Year: 2018).*

Einhorn et al. ("Generic NDT mapping in dynamic environments and its application for lifelong SLAM," Robotics and Autonomous Systems 69 (2015)) (Year: 2015).*

Green et al. ("Normal distribution transform graph-based point cloud segmentation," Int'l Conf. Pattern Recognition Association of South Africa and Robotics and Mechatronics, Nov. 16-27, 2015) (Year: 2015).*

Magnusson, Martin ("The three-dimensional normal-distributions transform: an efficient representation for registration, surface analysis, and loop detection," Ph.D. Dissertation, Örebro University, Dec. 2009; published 2013) (Year: 2013).*

Rakha et al., 2018, "Review of Unmanned Aerial System (UAS) applications in the built environment: Towards automated building inspection procedures using drones" (pp. 252-264). (Year: 2018).*

PCT International Search Report and Written Opinion (w/ English translation) for corresponding PCT Application No. PCT/EP2021/067576, mailed on Dec. 3, 2021, 21 pages.

United Kingdom Search Report for corresponding UK Application No. GB2010686.0, mailed on Dec. 15, 2020, 5 pages.

Shen Shaojie et al: Obtaining Liftoff Indoors: Autonomous Navigation in Confined Indoor Environments, IEEE Robotics & Automation Magazine, IEEE Service Center, Piscataway, NJ, US, vol. 20., No. 4, Dec. 1, 2013 (Dec. 1, 2013), pp. 40-48.

Ehlers Simon F G et al: "Map Management Approach for SLAM in Large-Scale Indoor and Outdoor Areas",2020 IEEE International Conference on Robotics and Automation (ICRA), IEEE,May 31, 2020 (May 31, 2020), pp. 9652-9658.

Nicholas Giovanni Corso: "Sensor Fusion and Online Calibration of an Ambulatory Backpack System for Indoor Mobile Mapping", Jan. 1, 2016 (Jan. 1, 2016), 84 pages.

Giorgio Grisetti et al: "A Tutorial on Graph-Based SLAM",IEEE Intelligent Transportation Systems Magazine, IEEE, USA, vol. 2, No. 4, Jan. 1, 2010 (Jan. 1, 2010), pp. 31-43.

International Preliminary Report on Patentability received in PCT/EP2021/067576, mailed on Jan. 19, 2023, 14 pages.

* cited by examiner

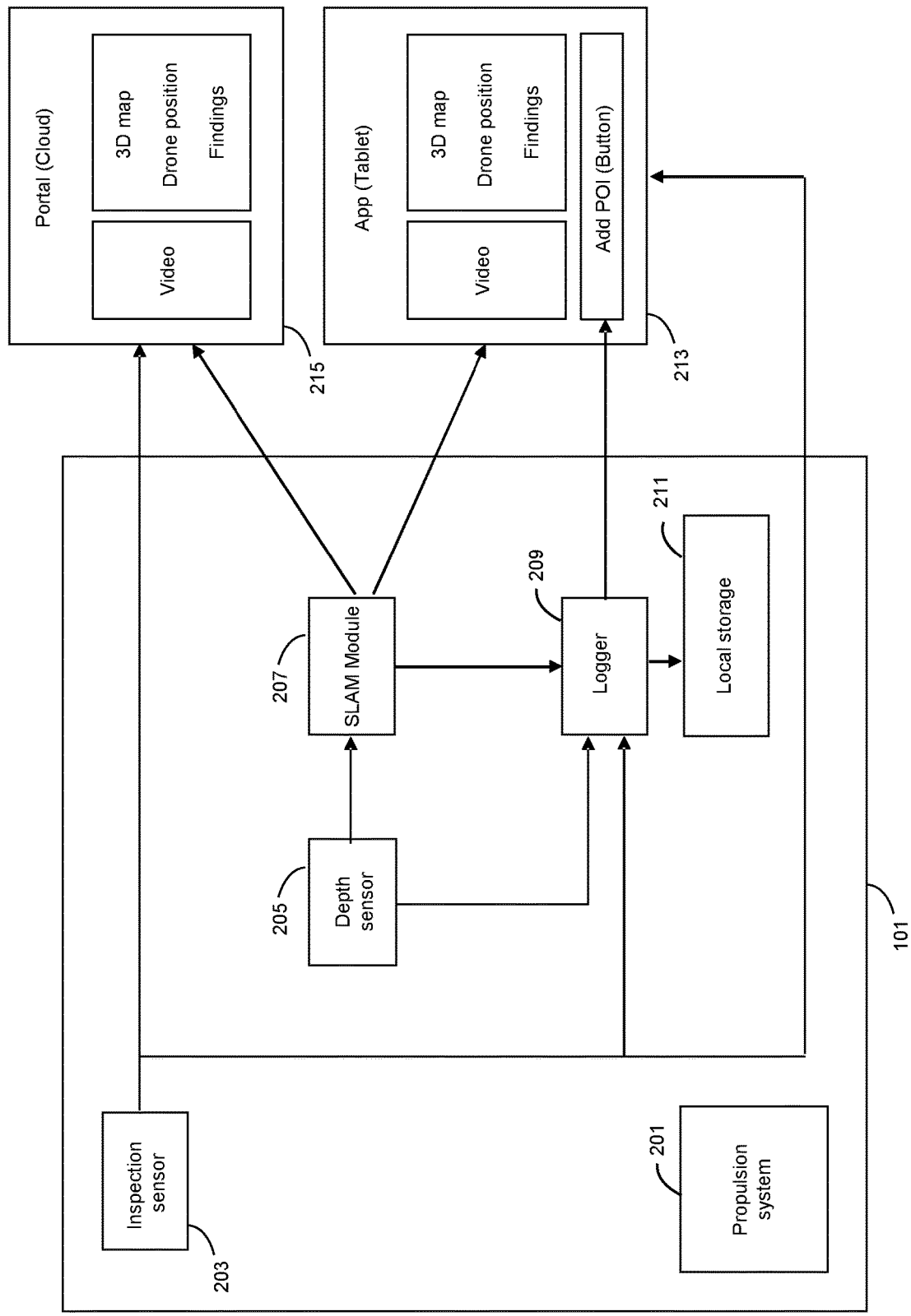

INSPECTION DEVICE FOR INSPECTING A BUILDING OR STRUCTURE

CROSS-REFERENCE TO RELATED APPLICATIONS

This application is a continuation of PCT International Application No. PCT/EP2021/067576, filed on Jun. 25, 2021, which, in turn, claims priority to GB Patent Application No. 2010686.0, filed on Jul. 10, 2020, both of which are hereby incorporated by reference in their entireties for all purposes.

FIELD

Embodiments described herein relate to an inspection device for inspecting a building or structure and methods for processing data captured by an inspection device during inspection of the building or structure.

BACKGROUND

In many industries, it s necessary to inspect buildings and other structures for any flaws that could undermine their structural integrity. Examples of this include both the nuclear industry and the oil and gas industry, where containers and other assets are used to store large quantities of hazardous and/or volatile substances. Other examples include the mining industry, where there is a clear need to monitor for instability in the walls or ceiling of mineshafts, as well as in the transport sector and maritime industry; observing the structural integrity of a ship's hull, for example, is critical for maintaining the vessel and keeping it in a seaworthy condition.

In many cases, inspection of such structures is carried out manually by assembling scaffolding rigs that maintenance personnel can then climb in order to inspect the walls, ceilings and/or other surfaces of the structure. However, this approach is both costly and time consuming, and exposes the human operators to risk of injury.

To address this problem, one possibility is to use an unmanned aerial vehicle or drone to inspect the structure. The drone is provided with a camera device that can be used to capture images of the structure during flight, with the maintenance personnel remaining at a safe location as it does so. The use of such devices does, however, pose additional challenges. In particular, if the drone is collecting a large number of images, it may be difficult to determine which part of the structure each individual image corresponds to. By using GPS signals, the drone's position can be monitored over time, thereby providing an idea of where the drone was located when a particular image was captured. However, there will be many situations where GPS signals are unavailable; the drone may, for example, be inspecting a structure or asset located underground, or else may be located within the structure itself in order to carry out an inspection of its interior. In other cases, the drone may be located in an outdoors environment but GPS signals may, nevertheless still be occluded by other structures located in the vicinity. Thus, even where an image shows the presence of a fault in the building or structure, the maintenance personnel will have insufficient information to determine precisely where in the structure that fault is located.

SUMMARY

According to a first aspect of the present invention, there is provided a method for processing data captured by an inspection device during inspection of a building or structure, the method comprising:

receiving sets of inspection data captured by one or more inspection sensors onboard the inspection device, each set of inspection data being captured from a different region of the building or structure and being suitable for evaluating the condition of the building or structure in the respective region, each set of inspection data being captured at a respective point in time as the inspection device maneuvers relative to the building or structure;

receiving sets of 3D data of the inspection device's surroundings, each set of 3D data being captured by one or more depth sensors onboard the inspection device at a respective point in time, wherein each set of 3D data comprises information indicating a distance of the device from one or more surfaces of the building or structure at the time of capture of the set of 3D data;

combining the sets of 3D data to obtain a 3D map of the device's surroundings when carrying out the inspection; and outputting data indicating, for each set of inspection data, a position of the device in the 3D map at which the set of inspection data was captured.

For each point in time at which a set of 3D data is captured, the set of 3D data collected at that point in time may be compared with a preceding set of 3D data using a scan matching algorithm, so as to determine a relative shift in position of the device between capturing the two sets of 3D data.

The position of the device may be determined using a Simultaneous Localization and Mapping (SLAM) algorithm. The SLAM algorithm may comprise a Graph-based SLAM algorithm.

Executing the SLAM algorithm may comprises updating a SLAM graph by performing a step of loop closure. The step of loop closure may comprise:

selecting a first set of 3D data and a second set of 3D data from the sets of 3D data, the second set of 3D data being different from the set of 3D data captured immediately prior to capturing the first set of 3D data;

determining a transform that provides a mapping between the point cloud of the first set of 3D data and a point cloud of the second set of 3D data;

determining an updated point cloud by applying the transform to the first set of 3D data or the second set of 3D data; and updating an estimated position of the device based on the transform;

wherein the step of updating the estimated position of the device is carried out subject to the condition that the number of points in the updated point cloud that are deemed to coincide with the point cloud of whichever one of the first set of 3D data and the second set of 3D data the transform was not applied to is above a threshold.

Executing the SLAM algorithm may comprise updating the SLAM graph by performing a step of loop closure using one of the sets of 3D data. The step of performing loop closure may be carried out subject to the uncertainty in positions of points in the point cloud of said one of the sets of 3D data being above a threshold.

The scan matching algorithm may comprise an Normal Distribution Transform (NDT) algorithm.

Executing the NDT algorithm may comprise:
for each set of 3D data:
generating a respective point cloud from the set of 3D data, wherein the point cloud comprises the coordinates of points on the surfaces as measured by the one or more depth sensors;

subdividing the 3D field of view of the depth sensor into one or more cells;
and for each cell:
identifying the coordinates of points in the point cloud located within the cell;
determining; based on the identified coordinates, a probability distribution that defines the probability of points in the point cloud being located at different positions throughout the volume of the cell;
wherein the volume of each cell is set to ensure that the number of points in the point cloud whose coordinates lie within the cell is above a threshold.

The volume of each cell may be determined based at least in part on a distance between the one or more depth sensors and one or more of the points in the point cloud that are located in that cell. The volume of each cell may be chosen to be spherical.

Setting the volume of each cell may comprise:
selecting an initial volume for the cells;
identifying one or more cells for which the number of points in the point cloud whose coordinates lie within the respective cell is beneath the threshold; and
adjusting the volume of the cell to increase the number of points in the point cloud whose coordinates lie within the cell.

When adjusting the volume of the cell, the cell may be extended preferentially in a particular direction. The cells may be extended preferentially in the vertical direction.

The method may further comprise:
receiving, for each point in time at which a set of 3D data is captured, additional depth data captured in a first direction by one or more additional depth sensors onboard the inspection device;
wherein for each point in time at which a set of 3D data is captured, the depth data captured from the one or more additional depth sensors is included as a constraint on the SLAM graph, subject to the condition that the inspection device has not undergone translation in a direction perpendicular to the first direction since the previous set of 3D data was captured by the depth sensor.

The method may further comprise: receiving odometry data captured by one or more odometry components onboard the inspection device, the odometry data defining a translational movement of the inspection device about one or more axes and/or a rotational movement of the inspection device around one or more axes in the interval between capturing successive sets of 3D data with the depth sensor;
wherein for each point in time at which a set of 3D data is captured, the odometry data obtained in the interval between that point in time and the previous point in time at which a set of 3D data was captured is used as a constraint on the SLAM graph for determining the position of the device in space.

The odometry components may comprise one or more of an accelerometer, gyroscope, magnetometer or barometer.

For each time point at which a set of 3D data is captured, a scan matching algorithm may be used to determine a horizontal translation in the x, y plane together with an estimate of yaw. The odometry data may be used in determining the roll/pitch and translation along the z axis.

The one or more inspection sensors may comprise a Non-Destructive-Testing (NDT) sensor.

Each set of inspection data may comprise an image of the respective region of the building or structure.

The inspection data may provide information concerning the structural integrity of the building or structure.

The one or more depth sensors may include a LIDAR unit.

The inspection data may be streamed in real time to a user device on which the user can visualize the inspection data.

The change in position of the inspection device may be streamed from the inspection device in real time to a user device.

The method may comprise: storing each set of inspection data and each set of 3D data in memory onboard the inspection device.

Each set of inspection data may be stored in association with a respective set of 3D data that was captured at the same point in time.

Each set of inspection data and each set of D data may be timestamped.

The method may comprise overlaying a model of the building or structure onto the 3D map for visualization by the user.

According to a second aspect of the present invention, there is provided a method for inspecting a building or structure, the method comprising:
maneuvering an inspection device relative to the building or structure;
capturing, by an inspection sensor onboard the inspection device, respective sets of inspection data from different regions of the building or structure, each set of inspection data being suitable for evaluating the condition of the building or structure in the respective region, each set of inspection data being captured at a respective point in time as the inspection device maneuvers relative to the building or structure;
capturing sets of 3D data of the inspection device's surroundings at respective points in time, wherein each set of 3D data comprises information indicating a distance of the device from one or more surfaces of the building or structure;
combining the sets of 3D data to obtain a 3D map of the device's surroundings; and
outputting data indicating, for each set of inspection data, a position of the device in the 3D map at which the set of inspection data was captured.

According to a third aspect of the present invention, there is provided a method for processing two sets of 3D data captured by one or more depth sensors onboard a device, each set of 3D data being captured at a respective point in time and comprising information that indicates a distance of the device from one or more surfaces in the device's surroundings, the method comprising:
executing a scan matching algorithm so as to determine a relative shift in position of the device between capturing the two sets of 3D data, wherein the scan matching algorithm comprises an Normal Distribution Transform (NDT) algorithm and comprises:
for each set of 3D data:
generating a respective point cloud from the set of 3D data, wherein the point cloud comprises the coordinates of points on the surfaces as measured by the one or more depth sensors;
subdividing the 3D field of view of the depth sensor into one or more cells; and
for each cell:
identifying the coordinates of points in the point cloud located within the cell;
determining, based on the identified coordinates, a probability distribution that defines the probability of points in the point cloud being located at different positions throughout the volume of the cell;
wherein the volume of each cell is set to ensure that the number of points in the point cloud whose coordinates lie within the cell is above a threshold.

According to a fourth aspect of the present invention, there is provided a computer readable medium comprising computer executable instructions that when executed by the computer will cause the computer to carry out a method according to any one of the first, second and second aspects of the present invention.

According to a fifth aspect of the present invention, there is provided a computer system comprising one or more processors configured to carry out a method according to any one of the first, second and third aspects of the present invention.

According to a sixth aspect of the present invention, there is provided an inspection device for inspecting a building or structure, the device comprising:
a propulsion system configured to maneuver the device relative to the building or structure;
one or more inspection sensors configured to capture, from each one of a plurality of regions of the building or structure, a set of inspection data for evaluating the condition of the building or structure in the respective regions, the inspection sensor being configured to capture each set of inspection data at a respective point in time as the device maneuvers relative to the building or structure;
one or more depth sensors for capturing sets of 3D data of the device's surroundings at respective points in time, wherein each set of 3D data comprises information indicating a distance of the device from one or more surfaces of the building or structure;
a processor configured to combine the sets of 3D data to obtain a 3D map of the surroundings;
the device being configured to output data indicating, for each set of inspection data, a position of the device in the 3D map at which the set of inspection data was captured.

The propulsion system may be configured to maneuver the device in three dimensions relative to the building or structure.

According to a seventh aspect of the present invention; there is provided a system comprising the inspection device according to the sixth aspect of the present invention and a user device for viewing the inspection data captured by the inspection device.

Embodiments described herein provide a means by which walls, ceilings and/or other surfaces of a building or structure can be surveyed and any faults identified, without the need for an external GPS signal to locate the inspection device.

BRIEF DESCRIPTION OF DRAWINGS

Embodiments of the invention will now be described by way of example with reference to the accompanying drawings in which:
FIG. 2 shows components of the inspection device of FIG. 1;

DETAILED DESCRIPTION

Figure 1:
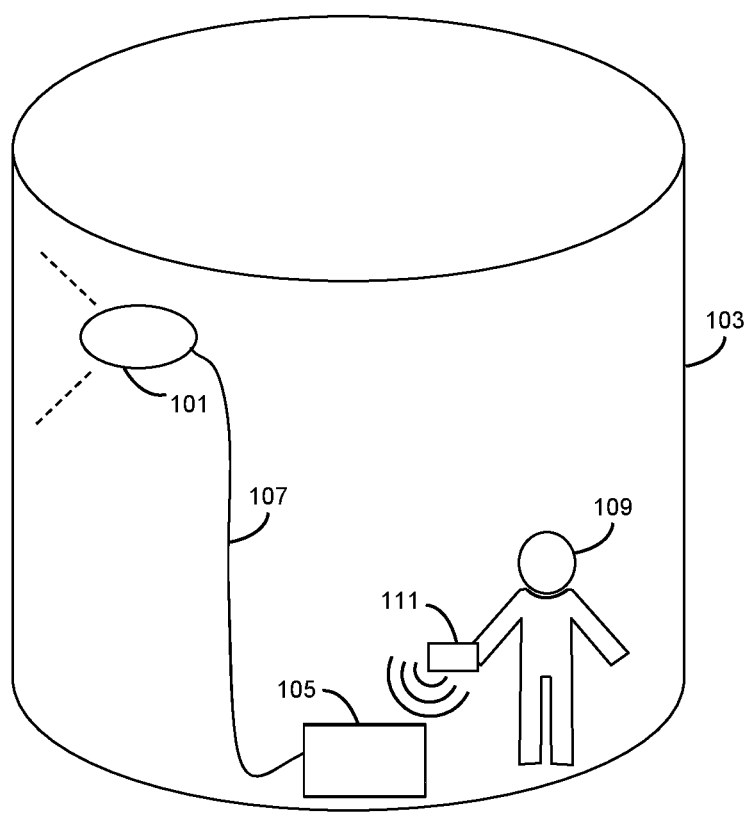
FIG. 1 shows a schematic of an inspection device being used to inspect an industrial asset according to an embodiment.

FIG. 1 shows an example of an inspection device 101 according to an embodiment. The inspection device comprises a drone or unmanned aerial vehicle (UAV) that can be used to inspect the walls, ceiling and/or other surfaces of a building or structure. In the example shown in FIG. 1, the device is being used to inspect the interior surfaces of an industrial asset 103, such as a storage tank for holding oil or compressed gas, for example. The asset 103 may be a fixed asset such as one located at an oil refinery, or an asset used in transporting chemicals between locations. For example, the asset could be a container that is designed to be loaded onto a vessel for transport by sea, or to be loaded onto a lorry or other vehicle for transport by road. In other examples, the building or structure may be the vessel itself.

The inspection device is connected to a ground station 105, which can both send and receive data to and from the inspection device via a communications link. In the example shown in FIG. 1, the communications link between the inspection device 101 and the ground station 105 is provided by a wire or cable 107, which also serves as a tether for the inspection device. In other embodiments, a wireless communication channel may be established between the ground station 105 and the inspection device 101.

An operator 109 can communicate with the inspection device via a hand-held control pad 111. The control pad 111 can connect to the ground station 105 via either a wired or wireless connection, with the ground station 105 serving as a relay for passing information between the inspection device 101 and the control pad 111.

It will be appreciated that whilst the present embodiment includes a ground station, in other embodiments, the ground station may be dispensed with and the operator may control the inspection device directly via the hand-held control pad (using a direct wireless connection, for example), hi other embodiments, the operator may control the inspection device from a remote location. For example, the inspection device may have a wireless transceiver for connecting to a communications network, and the operator may operate the inspection device by sending instructions to the inspection device and/or receiving data collected by the inspection device over the communications network.

Since the inspection device 101 is contained within the asset itself, there are no GPS signals available for the inspection device to use in determining its position in space. The same will apply in other scenarios in which GPS signals are absent or else prevented from reaching the inspection device, such as when inspecting an underground structure like a mineshaft, for example. As discussed in more detail below, in order to surmount this problem, the inspection device 101 is able to establish its position in space by mapping its own surroundings as it maneuvers relative to the structure.

FIG. 2 shows components of the inspection device 101 in more detail. The inspection device comprises a propulsion system 201 that is used to maneuver the device relative to the structure. The propulsion system 201 is such as to facilitate motion of the device along each axis (x, y and z) independently; that is, the propulsion system can provide for movement in any direction that the operator selects. The propulsion system may be based on that of a conventional quadcopter, comprising one or more motors and propellers, for example. In some embodiments, the propulsion system may facilitate rotation about one or more of the x, y and z axes. For example, the propulsion system may provide control of the yaw of the device; the propulsion system may be designed so as to allow translation in one or more of the x, y and z axes whilst maintaining the same degree of yaw.

Before commencing inspection, the inspection device 101 may be programmed with a predetermined flight trajectory, which will then be implemented using the propulsion system. In other embodiments, the device may determine its own flight path autonomously as the inspection progresses, or else the flight path may be controlled manually by the operator 109 via the control pad 111.

The inspection device 101 includes one or more inspection sensors 203 that are used to inspect the surfaces of the structure. As the device maneuvers relative to the structure 103, the inspection sensor(s) collect respective sets of inspection data from different regions of the structure. The sets of inspection data can then be used to identify any cracks or other faults that signal a degradation in the structure, and/or which might threaten its structural integrity.

The inspection sensor(s) 203 may comprise one of a number of different known sensors in the art for examining the condition of a wall or structure. In one example, the inspection sensor(s) may comprise a camera that is configured to capture images of the structure at different points on its surfaces. The camera may be a 3D camera. The camera may be configured to collect images in one or more different wavelength bands. For example, the camera may be configured to detect signals in one or more of a visible part of the spectrum, an Infra-Red (IR) band, or an Ultraviolet (UV) band. In some embodiments, the inspection sensor may be provided with an illumination source for illuminating the part of the surface being imaged, with the wavelength of light used to illuminate the surface being chosen according to the detection band of the camera. In one example, a UV light source such as a UV LED may be used to illuminate the surface of the structure, and the camera may detect fluorescence emitted from the structure at longer wavelengths.

More generally, the one or more inspection sensors 203 may comprise one of a number of different sensors used for Non-Destructive Testing (NDT). Non-Destructive Testing encompasses a wide range of techniques in which the properties of a material or component of a structure can be assessed without causing damage to the part under evaluation. By way of example, the inspection device may be configured with probes and/or sensors to perform one or more of Ultrasonic Testing, Electromagnetic Testing and Magnetic Flux Leakage Detection. In the case of Ultrasonic Testing, the inspection device may comprise an acoustic transducer for generating acoustic waves and detecting the acoustic signals reflected from different layers of the structure, which can then be used to build up a picture of the structure. For Electromagnetic Testing, the inspection device may comprise a probe for inducing an electric current in an electrically conductive part of the structure and for sensing the resultant electromagnetic fields close to the surface. The presence of any faults or defects in the structure can then be visualized as a disturbance in those electromagnetic fields. Magnetic Flux Leakage may be used to inspect steel structures, among others. In this case, the inspection device may comprise a magnet for creating a magnetic field that will saturate the steel contained within the structure. The inspection device may then include a sensor for sensing changes in magnetic flux density that may be indicative of degradation of the steel structure.

The inspection device 101 further includes a depth sensor 205 and a SLAM (Simultaneous Localization and Mapping) module 207, that together are used to map the surrounding environment of the inspection device and determine its position as it maneuvers relative to the structure. By doing so, it is then possible to tag each set of inspection data with positional data indicating the position of the device at the time the inspection data was captured. The positional data associated with each set of inspection data can enable the operator/maintenance personnel to determine which part of the structure each set of inspection data relates to, and in turn to identify the precise location of any faults seen within a particular set of inspection data.

In more detail, the depth sensor 205 is used to capture successive sets of 3D data as the inspection device maneuvers 101 relative to the structure. Each set of 3D data provides a measure of the distance of the inspection device from one or more surfaces of the structure, at a particular point in time. The set of 3D data collected at each point in time may be used to compile a 3D image or point cloud of the surrounding environment at that particular point in time.

The depth sensor 205 may comprise one of a number of different types of sensor for capturing spatial information in three dimensions. In some embodiments, the depth sensor 205 comprises a LIDAR unit, which by scanning one or more light beams in different directions and monitoring properties of the beams reflected back towards the device from different surfaces can build up a 3D image or point cloud of the device's surroundings. In other cases, the depth sensor may comprise a structured light scanner that captures images of the surfaces when illuminated with a particular light pattern; depth information can then be recovered by observing the change in intensity seen at different points when a phase shift is introduced in the illumination pattern. The depth sensor may comprise, for example, a time of flight camera, a holographic scanner, or a stereo camera. Other types of depth sensor capable of 3D imaging may also be used. For example, the sensor may be configured to capture 3D data using laser triangulation or structured light.

The depth sensor may be provided as a single component or as several individual components, with the data from each individual component then being combined to generate the 3D image or point cloud of the device's surroundings. For example, the depth sensor may comprise several cameras, arranged at different positions on the device, so as to capture images of the same region from different angles with the images then being combined to produce a single set of depth data for that region.

The SLAM module 207 is a processing unit that uses the sets of 3D data obtained by the depth sensor to generate a global 3D map of the environment and the position of the inspection device within that map. The term SLAM encompasses a range of algorithms that can be used by autonomous agents (robots, vehicles, UAVs etc.) to map their particular environment. In the examples described below, the device employs a Graph based SLAM approach, but it will be appreciated that other types of SLAM algorithm (for example, ones based on extended Kalman Filters) may also be used by the device.

The principles of Graph based SLAM are discussed in detail in a paper by Grisetti et al (A Tutorial on Graph Based SLAM", IEEE Intelligent Transportation Systems Magazine 2(4), December 2010, pages 31-43). In what follows, an overview of the SLAM technique as employed in various embodiments will be provided.

Figure 3A:
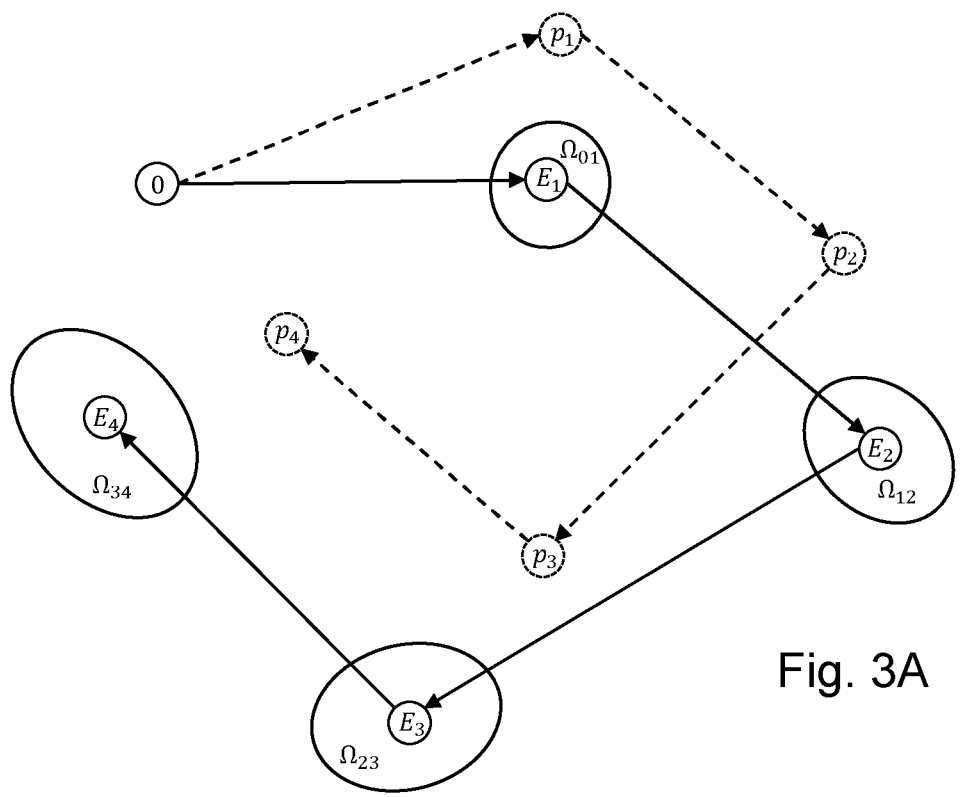
FIG. 3A shows a SLAM graph for use in understanding the function of the inspection device of FIG. 2 according to an embodiment.

FIG. 3A shows a collection of nodes on a SLAM graph that together reflect the positions $\{0, p_1, p_2, \ldots p_n\}$ of an inspection device such as that shown in FIG. 1 at different points in time $\{0, t_1, t_2, \ldots t_n\}$. It will be understood here that the positions $\{0, p_1, p_2, \ldots p_n\}$ represent the (true) position of the device relative to a particular reference point, which will usually be the origin i.e. the position at which the inspection device is located when it commences its inspection. Also shown on the graph are nodes reflecting estimated positions $\{0, E_1, E_2, \ldots E_n\}$ of the device; that is, the nodes $\{0, E_1, E_2, \ldots E_n\}$ are estimates of the respective positions $\{.0, p_1, p_2, \ldots p_n\}$. In this case, the point 0 reflects the initial starting position of the device (the origin) at time $t_0$, hence the estimated position and actual position correspond to one another that point.

Each position can be represented by a vector of elements that define the distance along each axis and the rotation about those axes. Thus, each node on the graph represents a vector with 6 elements $\{x, y, z, \alpha, \beta, \gamma\}$ where $\alpha$, $\beta$ and $\gamma$ define the rotation about the x, y and z axes, respectively. In some embodiments, the attitude may be represented with quaternions, with four elements and a constraint to avoid gimbal-lock, but the principles discussed below still apply.

At time $t_0$, the depth sensor captures a set of 3D data that reflects the current distance of the inspection device from surfaces in the surrounding environment. At a later time $t_1$ the inspection device moves from its initial position to a new position $p_1$. Using the depth sensor, the inspection device now captures a new set of 3D data at the current location and performs a step of scan matching in which the two sets of 3D data are compared with one another (a number of different scan matching algorithms may be used for this process; as discussed in more detail below). By identifying a transform that maps the spatial data captured at $t_0$ to that captured at $t_1$, it is possible to infer motion of the inspection device in the interval between capturing the two sets of 3D data. The motion can in turn be used to determine an estimate of the position of the device at $t_1$, relative to its position at $t_0$.

The estimated position of the inspection device at $t_1$ is shown on the graph by the node $E_1$. At this point, it is not possible to determine the "true" position $p_1$; rather, it is understood that there will exist a degree of error between that true position and the estimate $E_1$. In more detail, the estimate $E_1$ has an associated uncertainty, which is characterized by an information matrix $\Omega_{01}$. The information matrix reflects the uncertainty in each element of the (estimated) position vector. The information matrix further provides a relative uncertainty in the measurement, which can be compared with that of subsequent measurements performed by the device as it continues to maneuver relative to the structure.

The above process is repeated again, with the device moving to a new (true) position $p_2$ at time $t_2$ and capturing another set of 3D data at that position. The set of 3D data captured at time $t_2$ is compared to the set of 3D data captured at time $t_1$ to obtain a new estimate $E_3$ of the device's position, relative to its position at $t_1$, this time with an uncertainty $\Omega_{12}$. The process then continues with the device moving to points $p_3$ and $p_4$ and estimates $E_3$ and $E_4$ (and associated uncertainty $\Omega_{23}$ and $\Omega_{34}$) being derived in the same way as above.

Figure 3B:
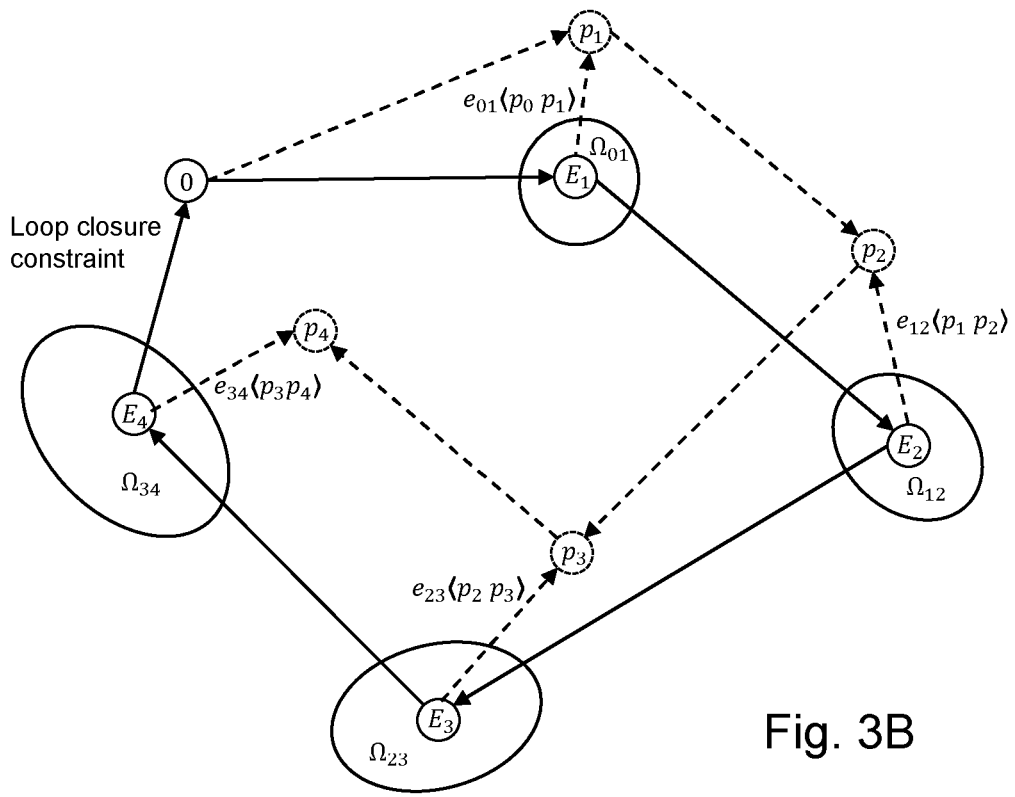
FIG. 3B shows the SLAM graph of FIG. 3A including errors between estimated positions and true positions of the inspection device.

Turning to FIG. 3B, this shows the same SLAM graph as in FIG. 3A, but with the errors $e_{01}\langle p_0 p_1 \rangle$, $e_{12}\langle p_1 p_2 \rangle$, $e_{23}\langle p_2 p_3 \rangle$ and $e_{34}\langle p_3 p_4 \rangle$ between the estimated positions $E_1$, $E_2$, $E_3$ and $E_4$ and the true positions $p_1$, $p_2$, $p_3$ and $p_4$. The goal of the SLAM algorithm is to revise the estimates of the device's position such that the sum of all the errors in the graph is minimized. In other words, the algorithm seeks to minimize the function:

$$w^* = \underset{w}{\mathrm{argmin}} \sum_{kj} e_{ij}^T \Omega_{ij} e_{ij}.$$

In order to minimize the function w*, the algorithm includes a stage of loop closure. Loop closure takes place when the device is able to identify a correspondence between the current set of 3D data and another previously captured set of 3D data, different from that which immediately precedes the current set. As an example, the inspection device may identify within the present set of 3D data features or landmarks that were previously seen in an earlier set of 3D data, Where this occurs, the device is able to infer it has now returned to an earlier position, or at least a point close to that earlier position. In FIG. 3B, the graph includes an additional arrow linking the estimate $E_4$ with the origin 0; this reflects a constraint on the graph imposed by loop closure i.e. the recognition that features present in the set of 3D data obtained at time $t_4$ correspond to ones seen in the original set of 3D data captured at time $t_0$ when the inspection device was located at the origin. The difference between the location of the features in the current set of 3D data and the location of those same features in the earlier set of 3D data can highlight a disparity between where the device believes it is currently located relative to that earlier position, and where it is actually located relative to that earlier position. As an example, on the basis of the estimates $E_1$, $E_2$, and $E_3$ in FIG. 2, the device may have estimated its position at $E_4$ to be 5 m from the origin 0; however, when comparing the features seen in the set of 3D data captured at the origin 0 with the same features seen in the set of 3D data captured at the point $p_4$, the device may infer, from the displacement of the features between the two sets of 3D data, that it is actually located 3 m from the origin. This "realization" provides new information that the device can use to correct its assumed trajectory and revise the estimates of its position $E_1$, $E_2$, $E_3$ and $E_4$.

Although the graph of FIG. 38 shows loop closure occurring between the last point in the trajectory and the origin, it will be appreciated that loop closure can occur between any two non-consecutive nodes in the graph (i.e. any two nodes that correspond to non-consecutive measurements of position). In some embodiments, in order to determine whether loop closure is possible with any existing node in the graph, each new set of 3D data may be compared with each one of the previous sets of 3D data captured to date. In other embodiments, in order to reduce the computational burden, the number of nodes with which the comparison is made may be limited, for example by only comparing the current set of 3D data with data sets corresponding to nodes within a certain radius of the current (estimated) position.

By using the information recovered from these loop closures, together with the relative uncertainties in each of the measurements, it is possible to continuously revise and update the earlier estimates of the device's (relative) position, by minimizing the function IV.

In addition, by capturing successive sets of 3D data indicating the distance of the inspection device from surfaces in its environment at different time points, and registering those sets of 3D data with one another using a process of scan matching, the SLAM module is able to compile a global 3D map of the environment i.e. one that combines the depth data from each individual set of 3D data. The global 3D map may comprise a point cloud in which each point lies on a surface in the surrounding environment, whereby the points together define the shapes of the surfaces. The global 3D map may comprise a list of the 3D coordinate positions of each point in a 3D coordinate frame.

The SLAM module is further able to identify the position of the device within the global 3D map at each point in time. In some embodiments, an existing 3D model of the building or structure, such as a CAD model may be provided, with the 3D model then being aligned or overlaid with the global 3D map for visualization by the user. The overlay of the 3D model may either be performed on board the inspection device, or alternatively may be carried out in the cloud and/or on the controller used by the operator to view the inspection data and global 3D map.

Figure 4:
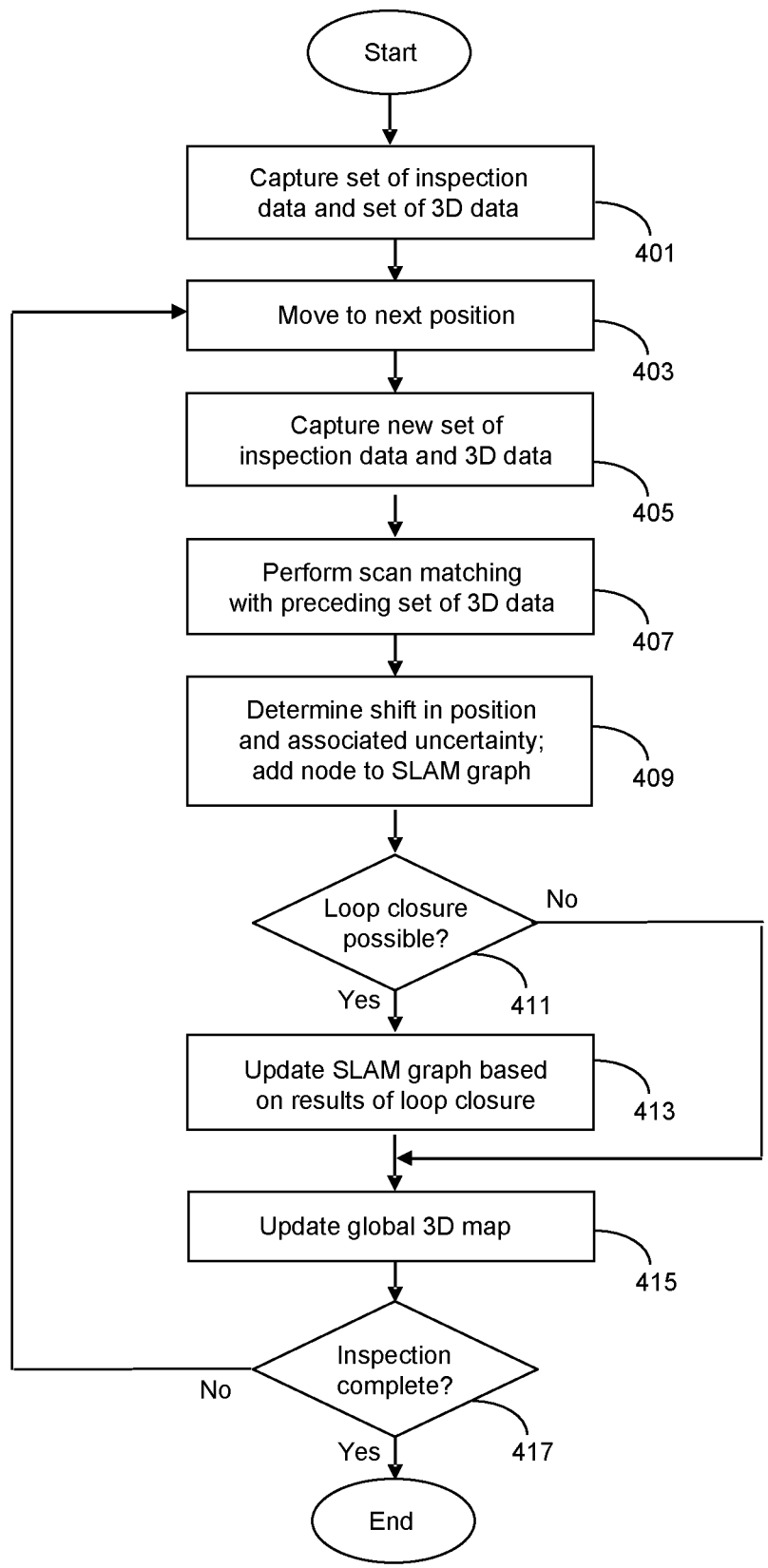
FIG. 4 shows a flow-chart of steps carried out by the SLAM module of FIG. 2.

The steps used in generating the global 3D map of the interior of the asset and the geo-tagged images are summarized in the flow-chart of FIG. 4. As shown in that figure, the process begins with the inspection sensor capturing a first set of inspection data at the device's initial position, and the depth sensor capturing a first set of 3D data from which a point cloud can be constructed (step S401). In step S403, the device moves to a new position and captures a new set of inspection data together with a new set of 3D data. In step S407, the SLAM module performs scan-matching by comparing the set of 3D data obtained at the current position with that obtained at the previous position. By identifying a transform that will map the set of 3D data collected from the earlier time point onto the set of 3D data captured at the present time point (or vice versa), the SLAM module is able to estimate the extent to which the inspection device has moved along the different axes and adds a node to the SLAM graph accordingly (step S409). In step S411, a decision is made as to whether loop closure is possible. The decision is carried out by comparing the current set of 3D data with the sets of 3D data obtained for other nodes on the graph and determining whether or not those sets of data correspond with one another (for example, whether they include any common features). In the first iteration of the method, no such possibility exists because the SLAM graph only contains two nodes. However, as the process repeats over multiple iterations, and a greater number of measurements are carried out, the number of nodes on the SLAM graph will increase to a point where loop closures start to become possible. In the event that a positive determination is made in step S411 (i.e. it is determined that the current set of 3D data shows a region of the structure that has already been profiled in an earlier iteration), a loop closure is made between the node(s) from that earlier measurement and the current measurement, and the SLAM graph is updated accordingly (step S413), The SLAM module is also able to update the global 3D map of the environment with the new 3D information obtained from the latest measurement (step S415), The process ends once there are no further measurements being carried out by the device (step S417).

Referring back to FIG. 2, each individual set of 3D data captured by the depth sensor can be logged by a logger 209 and stored in memory 211, together with the output from the SLAM module. The output from the SLAM module may include both the SLAM graph and updates made to that graph, as well as the global 3D map obtained by combining each individual set of captured 3D data. In a similar way, the sets of inspection data captured at each time point may also be input to the logger 209. The logger 209 may geo-tag each set of inspection data by associating the set of inspection data with a position of the inspection device within the global 3D map at the point in time that the inspection data was captured. For example, each set of inspection data may have associated metadata that describes the position and/or pose of the inspection device at the point in time when the inspection data was captured. In another example, each set of inspection data and 3D data may be timestamped with the time of capture, and sets of data having the same timestamp may then be stored in association with one another. The geo-tagging will enable the operator/maintenance personnel to determine which part of the structure each set of inspection data relates to, and in turn identify the location of any faults seen within a particular set of inspection data.

It will be appreciated that when capturing a particular set of inspection data, this may not always directly coincide with capturing a respective set of 3D data; that is, the inspection device may capture a set of inspection data during an interval between capturing two sets of 3D data, and vice versa. Indeed, it is not essential for the device to capture the sets of inspection data and 3D data simultaneously. Provided that the time of capture of each set of inspection data is logged and the time of capture of each set of 3D data is also logged, it will be possible to determine where in the global 3D map the inspection device was located when capturing a particular set of inspection data, simply by comparing the time of capture of that set of inspection data with the time of capture of different sets of 3D data. In some embodiments, for example, each set of inspection data may be associated with a set of 3D data whose time of capture most closely corresponds to that of the respective set of inspection data. In other embodiments, an interpolation may be made between measurements. For example, in the event that a set of inspection data is logged as having been captured in an interval between capturing a first set of 3D data and a second set of 3D data, the location of the inspection device at the time of capturing the inspection data may be determined to be midway between the location of the device at the time of capturing the first set of 3D data and the second set of 3D data.

It will further be understood that the act of capturing an individual set of inspection data or 3D data may not happen instantaneously but may last a finite time, of the order of milliseconds or seconds, for example. In this case, the time of capture that is logged may be the point in time at which capture of the respective set of data is completed, or else a point in time midway through capturing the set of data, for example.

Thus, the geo-tagged inspection data can serve to indicate, to a close approximation, the location of the inspection device within the global 3D map at the time the inspection data was captured.

The geo-tagged inspection data may be communicated from the inspection device to the operator's control pad 213 via the ground station. Each set of inspection data may be processed by circuitry on board the inspection device—or at the ground station or control pad itself—in order to generate graphs and/or images that allow the operator to easily visualize the results of the non-destructive testing. The inspection device may include a wireless transceiver (not shown in FIG. 2) by means of which the inspection data and the global 3D map can be uploaded to the cloud for retrieval via a web-based portal 215 at a later point in time.

As the SLAM module compiles the global 3D map of the environment, it is possible to stream the inspection data captured by the device over a communications network to a user terminal where the operator can view the inspection data live in real time using a web browser, for example. The inspection data may be viewed together with a 3D view of the environment, where the 3D view of the environment is generated based on the global 3D map output by the SLAM module. The 3D view of the environment may be updated every time the SLAM algorithm updates the global 3D map.

Figure 5:
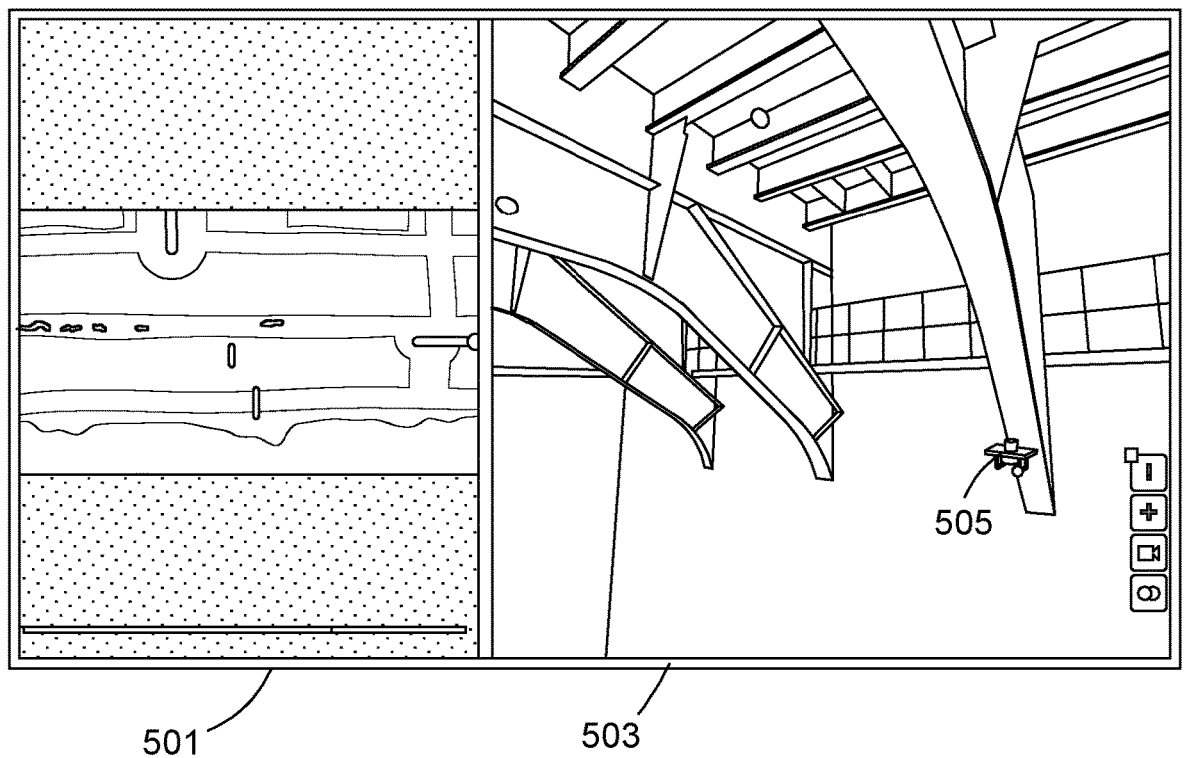
FIG. 5 shows an example image and a 3D model as output by the inspection device of FIG. 2 at a particular moment in time.

The 3D view of the environment may also include a depiction of the inspection device, showing its location relative to the structure at the time each set of inspection data was captured. An example of this is shown in FIG. 5. In this case, the inspection sensor comprises a camera used to collect images of the interior walls and ceiling of an asset. FIG. 5 shows an image frame 501 captured by the camera at a particular moment in time alongside a view of the interior of the asset 503. Also shown in the Figure is the position of the inspection device 505 within the global 3D map. The 3D rendering of the environment is possible using the global 3D map assembled by the SLAM module. As the images are streamed, the position of the inspection device as seen within the global 3D map is updated accordingly, thereby allowing the operator to easily identify which part of the interior a given image relates to. In the event that a particular image captures a fault, such as a crack in the wall of the interior, the operator can determine precisely where in the structure that crack is located.

The process of scan matching will now be discussed in more detail. Having collected respective sets of 3D data at two time points $t_i$ and $t_{i+1}$, a number of techniques may be used to determine a mapping between the two sets of 3D data. In one example, an Iterative Closest Point (ICP) algorithm may be employed. In another example, the 3D data collected at the first time point $t_i$ may be analyzed to identify landmarks in the vicinity of the device. These landmarks may include, for example, an unevenness or ridge in the walls of the structure or the presence of any supporting struts that extend away from the walls etc. The same step may then be carried out using the set of 3D data collected at the second time point $t_{i+1}$. The inspection device may then be able to infer from the positions of those landmarks in the two sets of data that the device has undergone a certain displacement since the first set of 3D data was captured.

A further method for performing scan matching is the Normal Distributions Transform method, as discussed in a paper by P. Biber and W. Stager entitled "The normal distributions transform: A new approach to laser scan matching" (Proceedings 2003 IEEE/RSJ International Conference on Intelligent Robots and Systems 2003). In this method, each individual set of 3D data is used to generate a respective 3D point cloud. Then, the 3D field of view for one of the measured sets of 3D data is subdivided into a plurality of cells or voxels. Within each cell, the points from the 3D point cloud that are located in that cell are used to generate a probability distribution for the cell, where that probability distribution reflects the probability of finding a point at any given position within the cell. The same steps are repeated for each cell to provide a series of spatial probability distributions across the 3D field of view.

As before, the goal of the scan matching procedure is to find a transform that when applied to the points in the point cloud from the second set of 3D data (i.e. that captured at $t_{i+1}$), will bring those points into optimal registration with the first set of 3D data (i.e. that captured at $t_i$). The transform that is chosen is one that maximizes the probability that points in the 3D point cloud from the second set of 3D data will be overlaid with points in the 3D point cloud from the first set of 3D data. That is, the method proceeds by identifying a transform that will shift the positions of points in the 3D point cloud from the second set of 3D data to positions that coincide with a peak or high value in the probability distributions obtained from the first set of 3D data.

The NDT algorithm provides an effective means for performing scan matching. However, in some cases, the probability distributions calculated for cells within the 3D field of view may be subject to error. This is particularly true where a cell only contains a limited number of points in the 3D point cloud. To address this point, conventional approaches will usually discount from consideration cells in which the number of points is below a threshold. Nevertheless, by doing so, these approaches do not fully utilize all the information available in the point cloud when performing scan matching.

Embodiments described herein can provide an alternative solution to the above problem. The solution is based on recognizing the fact that, in general, the density of points in the point cloud will tend to fall as a function of the distance of the points from the inspection device. This follows as a consequence of the fact that the device is having to probe a greater volume of space; as an example, in the event where the depth sensor comprises a LIDAR unit, the beams from a LIDAR unit will spread out over a greater distance as they travel further from the source, and hence points that are detected at longer distances will be spaced apart to greater degree. Where the inspection device is located close to the wall or surface being mapped, this will tend not to be such an issue, as the scan beams will only have a short distance over which to fan out before reaching that surface. However, at longer distances, the fact that that the beams fan out to larger extent means that there will be a smaller density of points recovered, Therefore, the number of points per cell or voxel will be too few to accurately determine a probability distribution.

Figure 6:
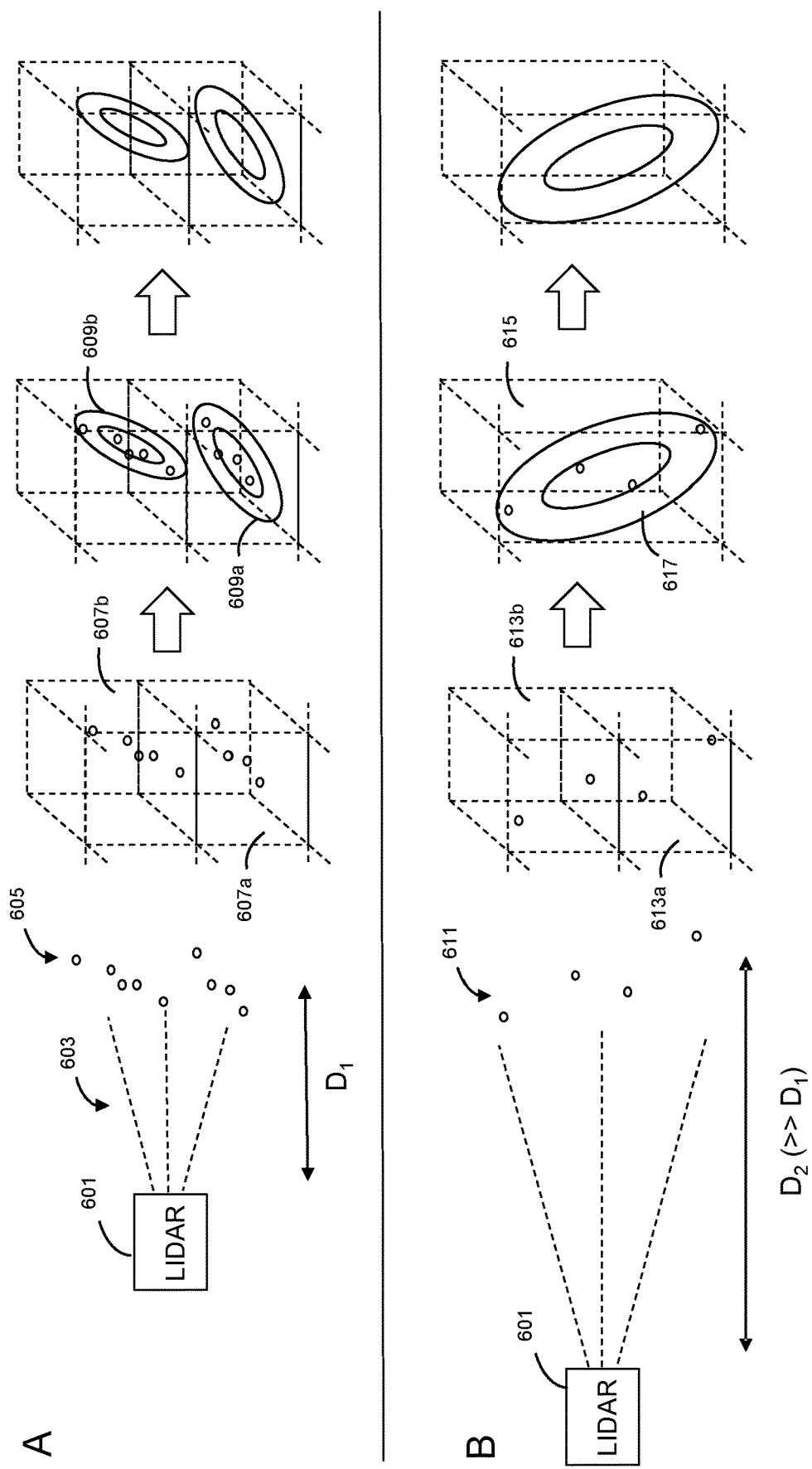
FIG. 6 shows a schematic of how probability distributions are determined when employing a Normal Distribution Transform (NDT) method for performing scan matching.

In order to accommodate the increased spacing between points in the point cloud, the volume of the cells may be adjusted to ensure that each cell includes a threshold number of points from the 3D point cloud. Since the density of points will tend to reduce with increased distance from the source, the size of the cell can be increased as a function of the distance from the source. This can be further understood by reference to FIG. 6. FIG. 6A shows a schematic of a LIDAR unit 601 that scans a region of space. The LIDAR comprises a plurality of beams 603 that fan out from one another as they travel. Where the beams are incident on a surface in the environment surrounding the LIDAR unit, they are reflected back to the LIDAR. The information contained in the reflected beams can then provide an indication of the position of the LIDAR unit relative to the points from which the beams have been reflected.

In the example shown in FIG. 6A, the LIDAR detects reflections from a group of points 605. The points 605 together define the surface profile of a surface located at an approximate distance $D_1$ from the LIDAR unit, Since the distance $D_1$ is fairly small, the beams 603 have not had time to diverge significantly from one another before being reflected, Consequently, the points 605 are located quite close to one another.

Having performed the scan, the data collected by the LIDAR unit can be used to generate a 3D point cloud, containing the points 605. The 3D field of view can then be subdivided into a plurality of cells. FIG. 6A shows two such cells 607a, 607b, which are the same shape and size as one another. The points 305 are spread throughout the two cells 607a, 607b, thereby defining two separate populations of points. The coordinate positions of the first population of points are used to determine a probability density function 609a that defines, for every coordinate position within the cell 607a, the probability of there being a point located at that position. Similarly, the coordinate positions of the second population are used to determine a second probability density function 609b that defines, for each coordinate position within the cell 607b, the probability of there being a point located at that position. In FIG. 6, the distributions are shown as ellipses that represent the contours of a 3D Gaussian probability distribution within each cell. The probability distributions 609a, 609b will provide the basis for determining an appropriate transform for scan matching with a second set of 3D data.

FIG. 6B shows a similar scenario to FIG. 6A, but in this case, the LIDAR unit 601 is located at a greater distance $D_2$ from a reflecting surface. As a consequence, the density of points 611 on the surface as detected by the LIDAR unit is smaller, since the beams 603 have diverged to greater extent before reaching the surface. As in FIG. 6A, the 3D field of view can be subdivided into a plurality of cells, of which two are shown 613a, 613b, and into which the detected points can be separated. In this case, however, there are too few points in each cell 613a, 613b to generate a respective probability distribution. However, by merging the two cells (in effect, defining a single cell 315 having twice the volume of the two cells 613a, 613b), a single population distribution 617 for the volume 615 can be obtained, by taking into account the entire collection of points 611. Therefore, in contrast to FIG. 6A, in which a respective population distribution is generated for the two smaller cell volumes 607a, 607b, a single probability distribution is obtained for a larger cell volume 615. Thus, rather than disregarding the information contained in the distribution of points 611, the information will still be retained when performing the registration between the 3D point cloud containing the points 611 and another 3D point cloud taken at a different moment in time.

It will be appreciated that a 3D field of view may be subdivided into cells having a plurality of different volumes and shapes by considering the distance to points located in each direction. Having collected the set of 3D data, the inspection device may determine an appropriate sizing of each cell by considering the distance from the device to different points in the point cloud, and defining the size of respective cells as a function of the distance to the points that lie within those regions of space. For example, if the inspection device is located close to one wall of a structure, but a long way from the opposing wall of the structure, then the point cloud obtained by the device is likely to include a greater density of points on the closer wall. When subdividing the 3D field of view into cells, those cells that include points located on the wall closest to the inspection device may be reduced in size compared to ones that are on the opposite site of the inspection device and which include points that lie on the opposing wall of the structure.

The precise shape of the cells may also vary. In some embodiments, a cell may comprise a sphere whose radius is set as a function of the distance from the inspection device to the points located within that cell. In some embodiments, when seeking to expand the volume of cells, a preference may be given to expanding in certain directions. For example, the cells may be increased in height, rather than width or depth; so as to include a greater number of points in the z direction; this may be particularly useful in cases where the structure being inspected is highly uniform in the z direction, and so even small variations in the surface profile in the z direction can be useful in carrying out the scan matching.

It will be appreciated that modified NDT algorithm, as described above with reference to FIG. 6, may be used in other applications, outside the scope of the particular embodiments described herein. For example, this method of scan matching need not always be implemented in combination with the capture and processing of inspection data, but could be implemented in any scenario in which it is desirable to perform scan matching between two sets of 3D data.

It will further be appreciated that when performing scan matching, it is important to ensure that any positive association made between features in different sets of 3D data is accurate i.e. that the 3D point clouds obtained from the depth sensor really do correspond to the same part of the structure. This is of particular concern when scan matching is used to carry out loop closure. In the case where scan matching is performed for two consecutive sets of 3D data (step S407 in FIG. 4), the likelihood of making a false association between features identified in the two sets of 3D data will be less, since the device is unlikely to have moved a significant distance between capturing those sets of data, and indeed will be relying on certain features from one set of 3D data being present in the subsequent set of 3D data in order to estimate the distance travelled. In the case of loop closure, the constraints are somewhat looser, however; if an association is made between features seen in the current set of 3D data and features identified in a set of 3D data from a node located elsewhere on the SLAM graph, there are typically fewer ways to verify whether the association is correct. In other words, it may be difficult to determine whether the device really has returned to its earlier position, or if the association between the features seen in the two sets of 3D data is in fact erroneous, and the device is actually now located in a completely different part of the structure. Given the importance of loop closure in generating an accurate map of the environment, it is important to ensure that loop closure is only carried out when there is a significant degree of confidence that the two sets of 3D data really do correspond to the same part of the structure. In order to achieve this, embodiments described herein may include a sequence of checks for the SLAM module to carry out as part of the loop closure process.

Figure 7:
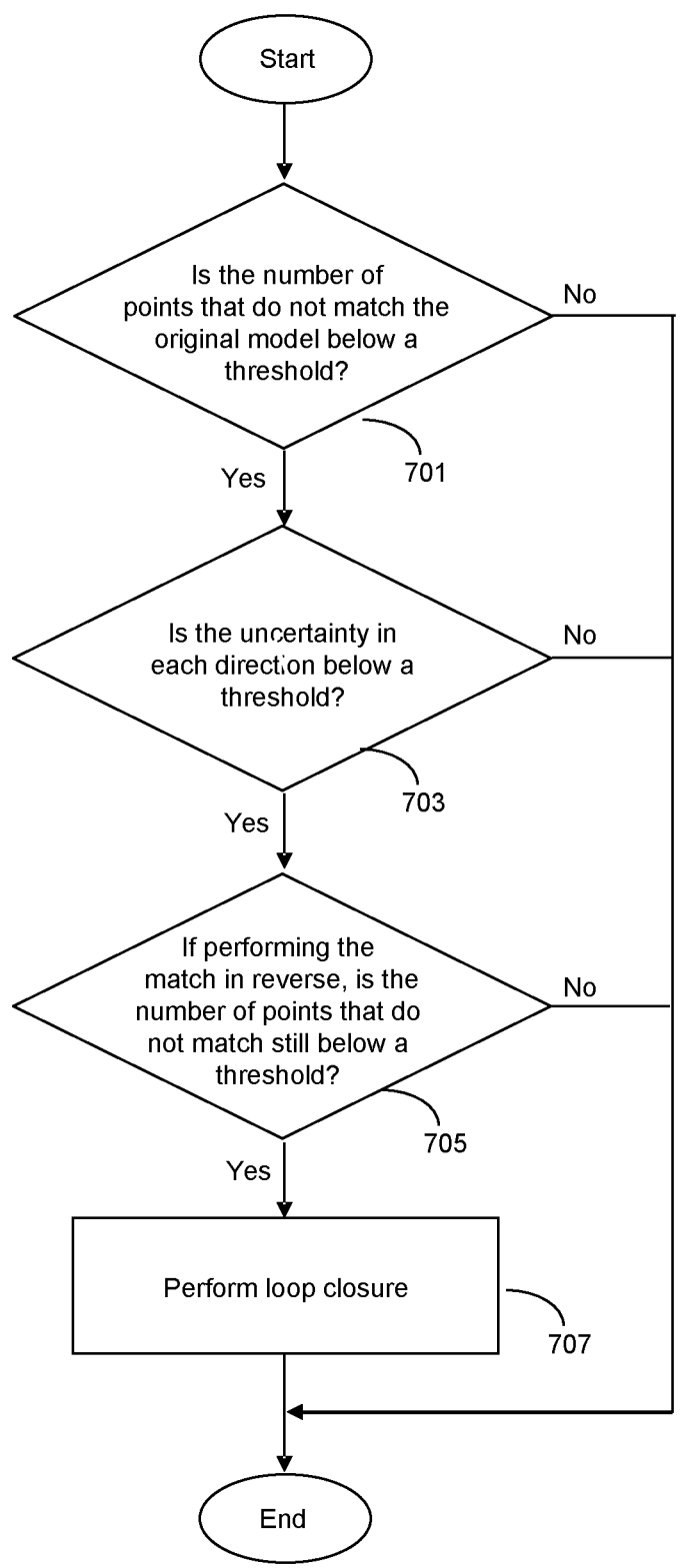
FIG. 7 shows a flow-chart of steps carried out by the SLAM module as part of the loop closure procedure of FIG. 4.

The above checks can be understood by reference to FIG. 7, which shows a flow-chart of steps that may be implemented as part of the loop closure step S411 of FIG. 4. To assess the possibility of loop closure(s), the SLAM module compares the 3D point cloud obtained from the latest set of 30 data with one or more sets of 3D data relating to other nodes in the graph. For each comparison, the SLAM module first determines how many points there are in the 3D point cloud obtained from the current set of 3D data that do not fit with the 3D point cloud obtained from the earlier set of 3D data (step S701). For example, if using a Normal Distributions Transform method, the optimal transform for mapping the current set of data to the earlier set of data may be determined and applied to the current set of data. Having performed this transform, a check may be made as to how many points in the (transformed) set of 3D data are now located at coordinate positions whose probability, as determined from the probability distribution associated with each cell, is below a threshold value. If the number of such points is above a predetermined threshold, the SLAM module rejects the earlier set of 3D data as a candidate for loop closure. Otherwise, the SLAM module proceeds to step S703. Here, a determination is made as to whether the uncertainty in position is sufficiently low in all directions. For example, in the case of the Normal Distributions Transform, the uncertainty may be determined based on the Hessian of the error function. If the uncertainty is too great, then the earlier set of 3D data is rejected as a candidate for loop closure. Otherwise, the SLAM module proceeds to the Step S705. In this step, the process carried out in step S701 is repeated in reverse i.e. the SLAM module determines how many points there are in the earlier set of 3D data that do not fit with the 3D point cloud obtained from the current set of 3D data. If that number is above a threshold, then the SLAM module rejects the earlier set of 3D data as a candidate for loop closure. Otherwise, if all three checks are completed successfully, the SLAM module proceeds with loop closure and updates the SLAM graph accordingly.

It will be appreciated that, although FIG. 7 requires each one of these above criteria to be met in order for the SLAM module to proceed with loop closure, in other embodiments these constraints may be loosened such that loop closure can still proceed provided that any one (or two) of these criteria are met.

Figure 8:
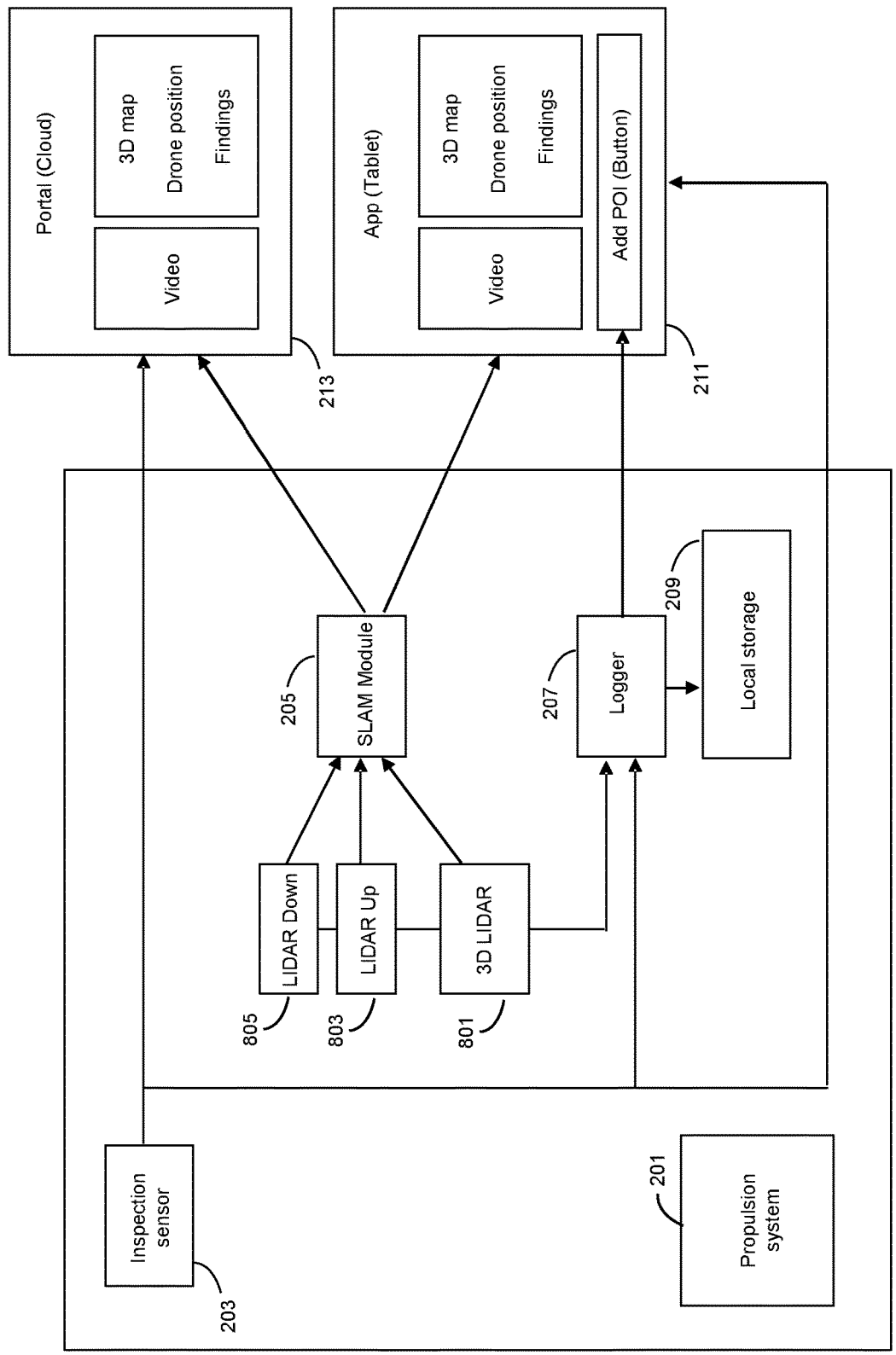
FIG. 8 shows a schematic of an inspection device according to an embodiment.

In some embodiments, the configuration of the depth sensor and/or the nature of the structure being inspected may mean that the displacement along certain axes (typically, the x and y directions) can be determined to a higher degree of accuracy than in the z direction. As an example, a U DAR unit may offer a higher resolution in the x-y plane than along the z-axis. FIG. 8 shows an example of embodiment in which the depth sensor comprises a LI DAR unit 801 (components having the same function as in FIG. 2 are labelled with the same reference numerals). In this embodiment, the device includes one or more additional laser devices 803, 805 that are arranged to obtain distance information in the vertical direction (the z axis). The device also includes a photodetector for detecting light that has been transmitted from the upwards or downwards pointing laser(s) and which has reflected off the ceiling or floor of the structure back towards the device. These reflected light signals will provide information about the distance of the device from the ceiling and/or floor of the structure being inspected. The additional laser(s) and photodetector(s) supplement the information obtained from the LI DAR unit so as to help compensate for the lower resolution of the LI DAR unit along the z axis.

For many types of structure, including assets used in the oil and gas industry, for example, it is not possible to guarantee that the roof and/or ceiling of the asset are flat. For example, an asset may have a series of struts that traverse the ceiling. In order to accommodate this, the device shown in FIG. 8 may only take the measurements from the one or more additional lasers 803, 805 into account when it is determined from the LI DAR scan that the drone is stationary in the x-y plane i.e. its motion is confined to the z axis, with no translation in the x-y plane since the last set of 3D data was captured. By doing so, it is possible to prevent the inspection device determining that its elevation in z has changed significantly, when in fact it has stayed at the same elevation and has simply moved beneath a strut that shortens the round trip of a beam emitted by the upwardly pointing laser 803.

Figure 9:
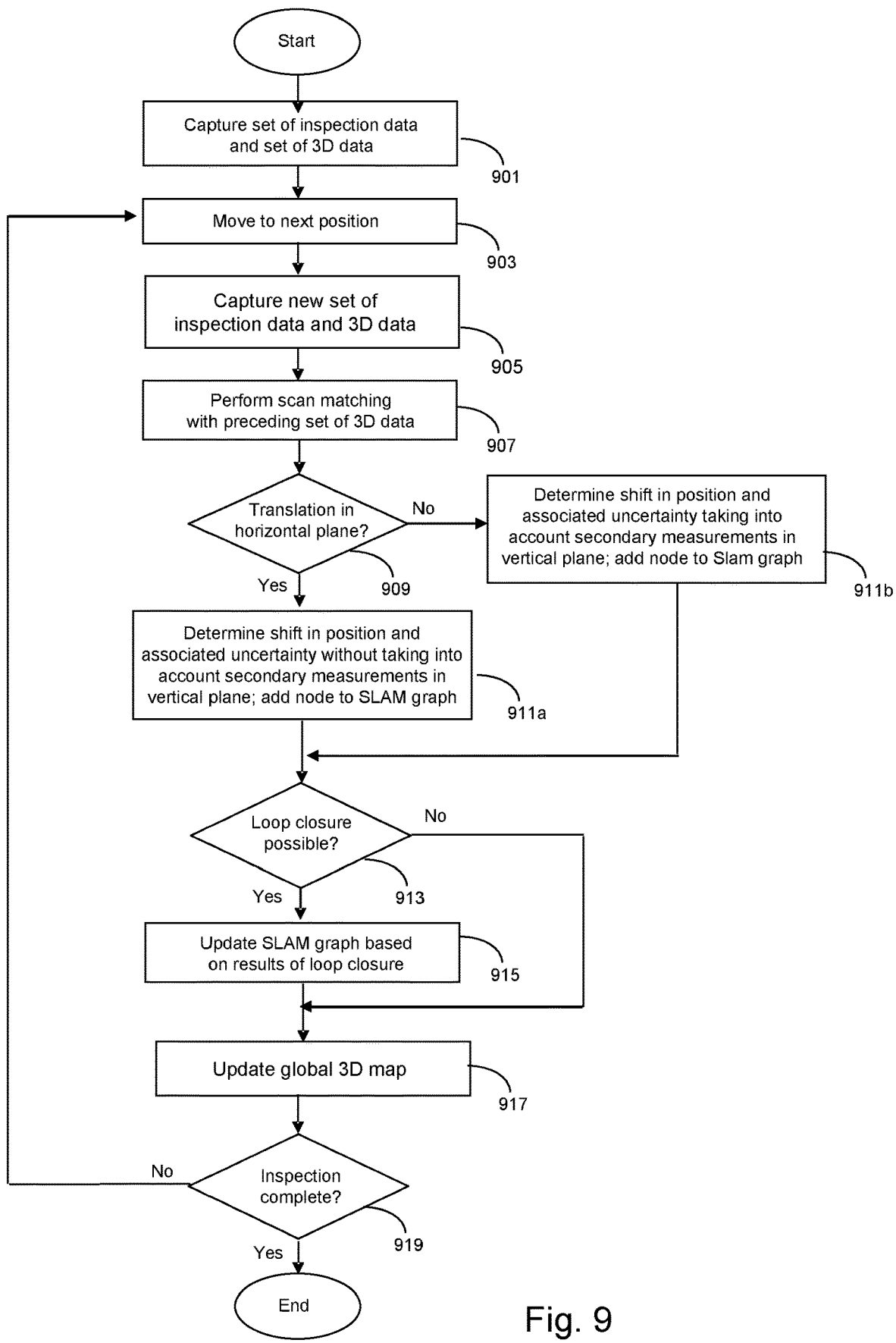
FIG. 9 shows a flow hart of steps carried out by the SLAM module of FIG. 8.

In cases where the measurements from the one or more additional lasers 803, 805 are taken into account, the information obtained from the additional lasers may provide an additional constraint on the SLAM graph. This is explained with reference to FIG. 9, which shows a sequence of steps as carried out by the inspection device of FIG. 8. The sequence of steps is largely similar to that shown in FIG. 5, but includes an additional decision point in step S909, in which the SLAM module determines whether there has been any translation in the x-y plane since the last set of 3D data was captured. If so, then the measurements obtained from the upwards and/or downwards pointing lasers are disregarded and the device's position estimated in the same way as in FIG. 5 (step S911a). In the case where there has been no translation in the x-y plane, the process moves to step S911b, in which the measurements obtained from the upwards and/or downwards pointing lasers are taken into consideration for computing the estimated position of the device.

Figure 10:
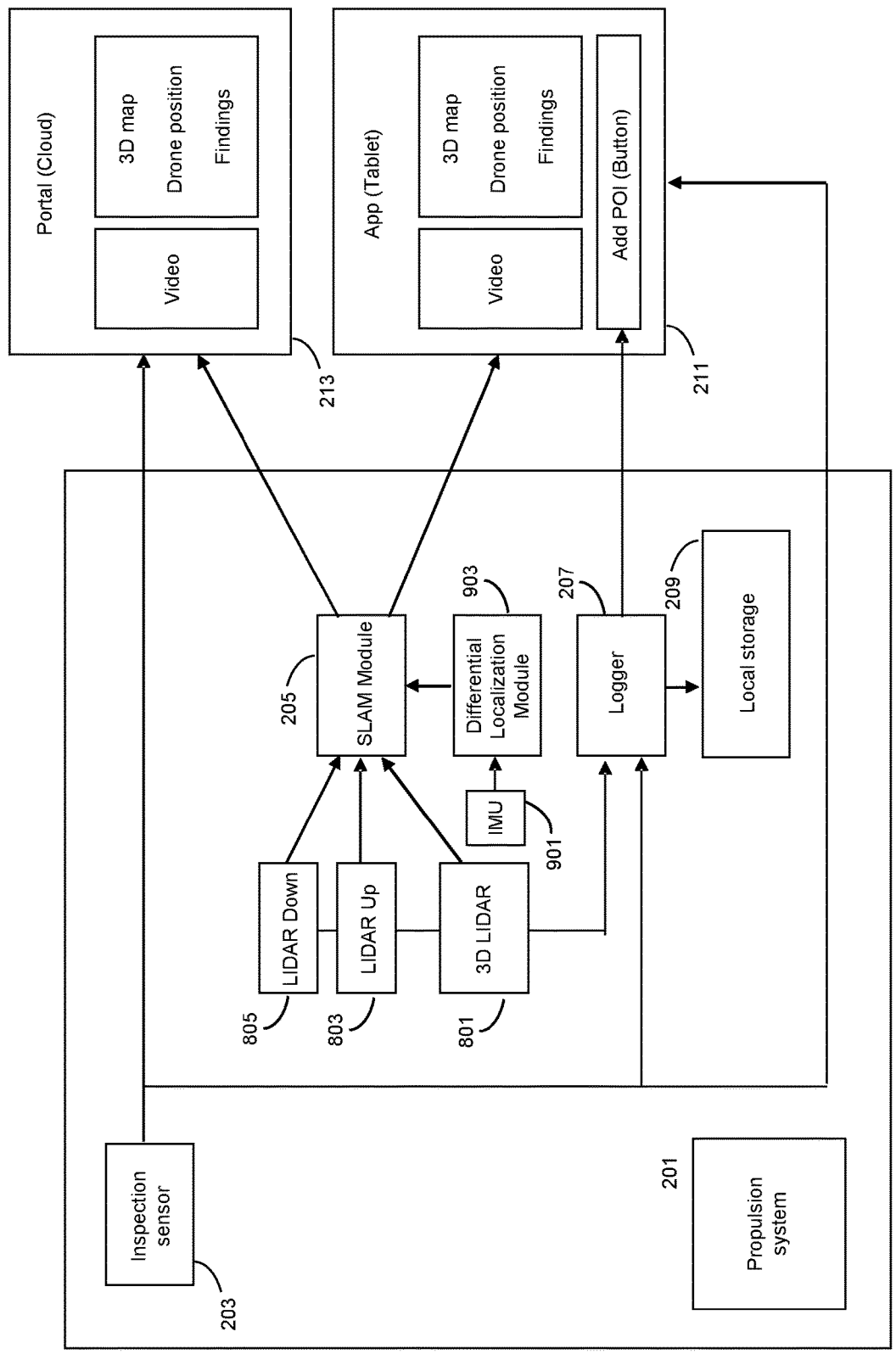
FIG. 10 shows a schematic of an inspection device according to an embodiment.

In some cases, relying on the use of scan matching alone for determining the position vectors of nodes in the SLAM graph can cause drift, as well as problems identifying movement along different axes in which there are few features in the 3D data from which to extract information. FIG. 10 shows a further embodiment in which the device is provided with additional components that can help to address this issue. As before, components having the same function as in FIGS. 2 and 8 are labelled with the same reference numerals. In the present embodiment, the inspection device includes an Inertial Measurement Unit (IMU) 901 and Differential Localization module 903, Together, the IMU 901 and Differential Localization module 903 provide additional information that can be used by the SLAM module 205 in order to more accurately determine the distance over which the device has moved in each direction between capturing successive scans with the LI DAR scanning unit 801.

The IMU 901 may comprise one or more accelerometers, gyroscopes, magnetometers or barometers, through which it is possible to derive odometry information such as the roll or pitch (and possibly altitude z). Although the error in pitch or roll is likely to be small in any one scan matching procedure, accumulation of these errors over time can make it very difficult to infer the correct position of the device when using an estimator that relies not only on the relative measurement, but also the absolute measurement in some directions (typically the x and y directions, and yaw). In one example, the SLAM module may perform scan-matching to determine the horizontal translation in the (x, y) plane, together with an estimate of the yaw. The IMU and Differential Localization module then provide input for determining the roll/pitch and translation along the z axis. Mien used in combination with SLAM (global map), this drift can be calculated and the correct global position can be calculated. In some embodiments, an external yaw source, such as a pyrometer, may be used to also provide an input into the SLAM module; this can be useful if the environment is such that there are no visual yaw features (such as in the case of a circular or spherical tank, for example).

Figure 11:
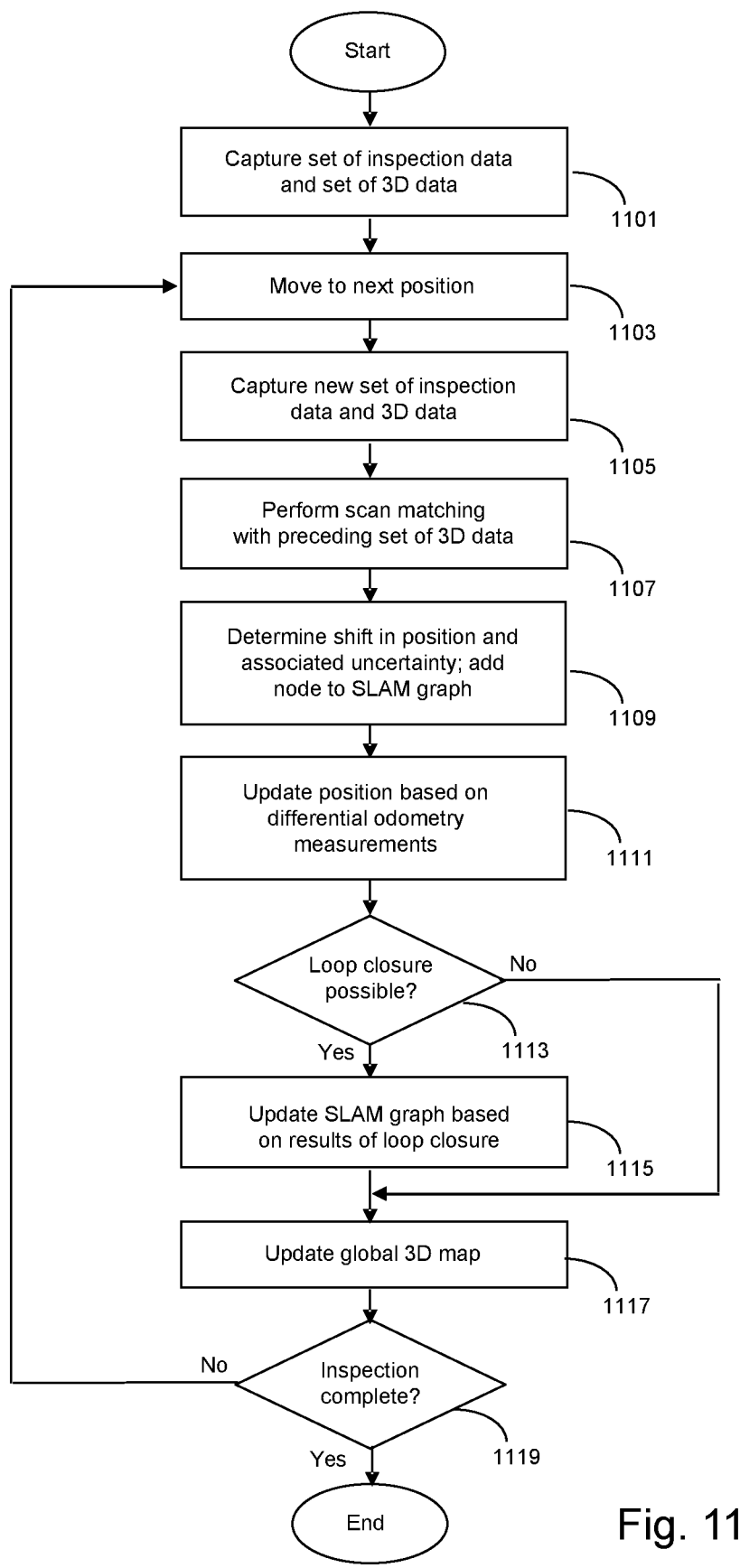
FIG. 11 shows a flow-chart of steps carried out by the SLAM module of FIG. 10.

FIG. 11 shows a sequence of steps as carried out by the device of FIG. 10. The steps are equivalent to those set out in FIG. 7 with an additional step (step S1111) in which information from the Differential Localization module is used to refine the estimate of the device's position as determined from the scan-matching in step S1109.

It will be understood that features described in relation to one of the above embodiments may be implemented independently, or in combination with features described in relation to any one of the other embodiments. For example, whilst FIG. 10 shows the Differential Localization module 903 being implemented alongside the additional laser units 803, 805, it will be understood that either one of these features may be implemented without the other one present, or alternatively may be implemented together in the same device as seen in FIG. 10.

Moreover, whilst in the above described embodiments, the SLAM module has been employed on-board the inspection device, it will be appreciated that it is not essential for the processing of the inspection data and sets of 3D data to take place on-board the inspection device; rather, the algorithms used to process the captured inspection data and sets of 3D data may be executed remotely from the inspection device. Thus, in some embodiments, the inspection device may simply capture the inspection data and sets of 3D data at the various time points and log the time of capture of those sets of inspection data and 3D data. The same may also apply in respect of any odometry data captured by the IMU and/or depth information captured by the additional depth sensors 803, 805 and which may be employed in constructing the SLAM graph. The captured data may then be sent from the inspection device to one or more computers located remotely from the device and processed in order to generate the 3D map of the device's surroundings, and to determine the position of the device in the 3D map at which each set of inspection data was captured. The forwarding of data and processing by a (remote) SLAM module may take place in real-time as the inspection is being carried out, with the 3D map being updated as the inspection progresses. Alternatively, the data captured by the inspection device may be stored in memory either onboard the device itself or at a remote location, and then processed at a later time following completion of the inspection.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, USB drives, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for processing data captured by a drone during inspection of a building or structure, the method comprising:
receiving sets of inspection data captured by one or more inspection sensors onboard the drone, each set of inspection data being captured from a different region of the building or structure, and wherein each set of inspection data is descriptive of a condition of the building or structure in the respective region, each set of inspection data being captured at a respective point in time as the drone maneuvers relative to the building or structure;
logging the respective points in time at which each set of inspection data is captured;
receiving sets of 3D data of the drone's surroundings, each set of 3D data being captured by one or more depth sensors onboard the drone at a respective point in time, wherein each set of 3D data comprises information indicating a distance of the drone from one or more surfaces of the building or structure at the time of capture of the set of 3D data;
logging the respective points in time at which each set of 3D data is captured;
combining the sets of 3D data to obtain a 3D map of the drone's surroundings when carrying out the inspection;
for each set of inspection data:
comparing the time of capture of the respective set of inspection data with the time of capture of different ones of the sets of 3D data, thereby to identify a set of 3D data whose time of capture corresponds to that of the respective set of inspection data; and
using the identified set of 3D data to determine a location in the 3D map where the drone was located when the respective set of inspection data was captured;
tagging each set of inspection data by associating the respective set of inspection data with the position of the drone in the 3D map at which the set of inspection data was captured, thereby to provide tagged inspection data, whereby the tagged inspection data serves to indicate the location of the drone within the 3D map at the time the respective set of inspection data was captured; and
generating a 3D view of an environment based on the 3D map, wherein the 3D view of the environment shows the location of the drone in the 3D environment at the time each set of inspection data was captured.

2. A method according to claim 1, wherein for each point in time at which a set of 3D data is captured, the set of 3D data collected at that point in time is compared with a preceding set of 3D data using a scan matching algorithm, so as to determine a relative shift in position of the drone between capturing the two sets of 3D data.

3. A method according to claim 2, wherein the position of the drone is determined using a Simultaneous Localization and Mapping (SLAM) algorithm and optionally wherein the SLAM algorithm comprises a Graph-based SLAM algorithm.

4. A method according to claim 3, wherein executing the SLAM algorithm comprises updating a SLAM graph by performing a loop closure, the loop closure comprising:
    selecting a first set of 3D data and a second set of 3D data from the sets of 3D data, the second set of 3D data being different from the set of 3D data captured immediately prior to capturing the first set of 3D data;
    determining a transform that provides a mapping between the point cloud of the first set of 3D data and a point cloud of the second set of 3D data;
    determining an updated point cloud by applying the transform to the first set of 3D data or the second set of 3D data; and
    updating an estimated position of the drone based on the transform;
    wherein updating the estimated position of the drone is carried out subject to the condition that the number of points in the updated point cloud that are deemed to coincide with the point cloud of whichever one of the first set of 3D data and the second set of 3D data the transform was not applied to is above a threshold.

5. A method according to claim 3, wherein executing the SLAM algorithm comprises updating a SLAM graph by performing a loop closure using one of the sets of 3D data, wherein performing the loop closure is carried out subject to the uncertainty in positions of points in the point cloud of said one of the sets of 3D data being above a threshold.

6. A method according to claim 2, wherein the scan matching algorithm comprises an Normal Distribution Transform (NDT) algorithm.

7. A method according to claim 6, wherein executing the NDT algorithm comprises:
    for each set of 3D data:
        generating a respective point cloud from the set of 3D data, wherein the point cloud comprises the coordinates of points on the surfaces as measured by the one or more depth sensors;
        subdividing the 3D field of view of the depth sensor into one or more cells; and for each cell:
            identifying the coordinates of points in the point cloud located within the cell;
            determining, based on the identified coordinates, a probability distribution that defines the probability of points in the point cloud being located at different positions throughout the volume of the cell;
    wherein the volume of each cell is set to ensure that the number of points in the point cloud whose coordinates lie within the cell is above a threshold.

8. A method according to claim 7, wherein the volume of each cell is determined based at least in part on a distance between the one or more depth sensors and one or more of the points in the point cloud that are located in that cell; and optionally wherein the volume of each cell is chosen to be spherical.

9. A method according to claim 7, wherein setting the volume of each cell comprises:
    selecting an initial volume for the cells;
    identifying one or more cells for which the number of points in the point cloud whose coordinates lie within the respective cell is beneath the threshold; and
    adjusting the volume of the cell to increase the number of points in the point cloud whose coordinates lie within the cell.

10. A method according to claim 9, wherein in adjusting the volume of the cell, the cell is extended preferentially in a particular direction; and optionally wherein the cells are extended preferentially in the vertical direction.

11. A method according to claim 3, further comprising:
    receiving, for each point in time at which a set of 3D data is captured, additional depth data captured in a first direction by one or more additional depth sensors onboard the drone;
    wherein for each point in time at which a set of 3D data is captured, the depth data captured from the one or more additional depth sensors is included as a constraint on the SLAM graph, subject to the condition that the drone has not undergone translation in a direction perpendicular to the first direction since the previous set of 3D data was captured by the depth sensor.

12. A method according to claim 3, comprising receiving odometry data captured by one or more odometry components onboard the drone, the odometry data defining a translational movement of the drone about one or more axes and/or a rotational movement of the drone around one or more axes in the interval between capturing successive sets of 3D data with the depth sensor;
    wherein for each point in time at which a set of 3D data is captured, the odometry data obtained in the interval between that point in time and the previous point in time at which a set of 3D data was captured is used as a constraint on the SLAM graph for determining the position of the drone in space.

13. A method according to claim 12, wherein for each time point at which a set of 3D data is captured, a scan matching algorithm is used to determine a horizontal translation in the x, y plane together with an estimate of yaw, and the odometry data are used in determining the roll/pitch and translation along the z axis.

14. A method according to claim 1, wherein the inspection data provides information concerning the structural integrity of the building or structure and/or wherein the inspection data is streamed in real time to a user device on which the user can visualize the inspection data.

15. A method according to claim 1, wherein each set of inspection data and each set of 3D data are timestamped.

16. A method according to claim 1, comprising overlaying a model of the building or structure onto the 3D map for visualization by the user.

17. A method for processing two sets of 3D data captured by one or more depth sensors onboard a drone, each set of 3D data being captured at a respective point in time and comprising information that indicates a distance of the drone from one or more surfaces in the drone's surroundings, the method comprising:
    executing a scan matching algorithm so as to determine a relative shift in position of the drone between capturing the two sets of 3D data, wherein the scan matching algorithm comprises an Normal Distribution Transform (NDT) algorithm and comprises:
    for each set of 3D data:
        generating a respective point cloud from the set of 3D data, wherein the point cloud comprises the coordinates of points on the surfaces as measured by the one or more depth sensors;

subdividing the 3D field of view of the depth sensor into one or more cells; and for each cell:
    identifying the coordinates of points in the point cloud located within the cell;
    determining, based on the identified coordinates, a probability distribution that defines the probability of points in the point cloud being located at different positions throughout the volume of the cell;
wherein the volume of each cell is set to ensure that the number of points in the point cloud whose coordinates lie within the cell is above a threshold.

18. A non-transitory computer readable medium comprising computer executable instructions that when executed by the computer will cause the computer to carry out a method according to claim 1.

19. A computer system comprising one or more processors configured to carry out a method according to claim 1.

20. A drone for inspecting a building or structure, the drone comprising:
    a propulsion system configured to maneuver the drone relative to the building or structure;
    one or more inspection sensors configured to capture, from each one of a plurality of regions of the building or structure, a set of inspection data for evaluating the condition of the building or structure in the respective regions, the inspection sensor being configured to capture each set of inspection data at a respective point in time as the drone maneuvers relative to the building or structure;
    one or more depth sensors for capturing sets of 3D data of the drone's surroundings at respective points in time, wherein each set of 3D data comprises information indicating a distance of the drone from one or more surfaces of the building or structure;
    a processor configured to combine the sets of 3D data to obtain a 3D map of the surroundings;
    the processor being configured to log the respective points in time at which each set of inspection data is captured, log the respective points in time at which each set of 3D data is captured and for each set of inspection data, compare the time of capture of the respective set of inspection data with the time of capture of different ones of the sets of 3D data, thereby to identify a set of 3D data whose time of capture corresponds to that of the respective set of inspection data, and to use the identified set of 3D data to determine a location in the 3D map where the drone was located when the respective set of inspection data was captured;
    the drone being configured to tag each set of inspection data by associating the respective set of inspection data with the position of the drone in the 3D map at which the set of inspection data was captured, thereby to provide tagged inspection data, whereby the tagged inspection data serves to indicate the location of the drone within the 3D map at the time the respective set of inspection data was captured; and
    wherein the processor is configured to generate a 3D view of an environment based on the 3D map, wherein the 3D view of the environment shows the location of the drone in the 3D environment at the time each set of inspection data was captured.

21. A method for processing data captured by a drone during inspection of a building or structure, the method comprising:
    receiving sets of inspection data captured by one or more inspection sensors onboard the drone, each set of inspection data being captured from a different region of the building or structure, and wherein each set of inspection data is descriptive of a condition of the building or structure in the respective region, each set of inspection data being captured at a respective point in time as the drone maneuvers relative to the building or structure;
    receiving sets of 3D data of the drone's surroundings, each set of 3D data being captured by one or more depth sensors onboard the drone at a respective point in time, wherein each set of 3D data comprises information indicating a distance of the drone from one or more surfaces of the building or structure at the time of capture of the set of 3D data, wherein for each point in time at which a set of 3D data is captured, the set of 3D data collected at that point in time is compared with a preceding set of 3D data using a scan matching algorithm, to determine a relative shift in position of the drone between capturing the two sets of 3D data, wherein determining the position of the drone comprises performing a loop closure, wherein the loop closure comprises:
        selecting a first set of 3D data and a second set of 3D data from the sets of 3D data;
        determining a transform that provides a mapping between the point cloud of the first set of 3D data and a point cloud of the second set of 3D data;
        determining an updated point cloud by applying the transform to the first set of 3D data or the second set of 3D data; and
        updating an estimated position of the drone based on the transform;
        wherein updating the estimated position of the drone is carried out subject to
        the condition that the number of points in the updated point cloud that are deemed to coincide with the point cloud of whichever one of the first set of 3D data and the second set of 3D data the transform was not applied to is above a threshold;
    combining the sets of 3D data to obtain a 3D map of the device drone's surroundings when carrying out the inspection;
    tagging each set of inspection data by associating the respective set of inspection data with a position of the drone in the 3D map at which the set of inspection data was captured, thereby to provide tagged inspection data, whereby the tagged inspection data serves to indicate the location of the drone within the 3D map at the time the respective set of inspection data was captured.

22. A method according to claim 1, wherein the inspection is carried out in the absence of GPS signals being able to reach the drone.

23. A method according to claim 1, comprising: providing one or more sets of the inspection data for display alongside the 3D view of the environment, wherein for each of the one or more sets of inspection data, the 3D view of the environment displayed alongside shows the location of the drone in the 3D environment at the time the respective set of inspection data was captured.

24. A method according to claim 22, wherein the inspection is carried out within a structure that prevents GPS signals from reaching the drone.

* * * * *